United States Patent [19]

Eisenmann

[11] Patent Number: 5,459,304
[45] Date of Patent: Oct. 17, 1995

[54] SMART CARD TECHNIQUES FOR MOTOR VEHICLE RECORD ADMINISTRATION

[75] Inventor: Jeffrey J. Eisenmann, Ocean Grove, N.J.

[73] Assignee: AT&T IPM Corp., Coral Gables, Fla.

[21] Appl. No.: 304,998

[22] Filed: Sep. 13, 1994

[51] Int. Cl.⁶ .................................................. G06K 5/00
[52] U.S. Cl. ........................ 235/380; 235/382; 235/384; 235/492
[58] Field of Search ................................. 235/380, 382, 235/384

[56] References Cited

U.S. PATENT DOCUMENTS

| | | | |
|---|---|---|---|
| 4,567,359 | 1/1986 | Lockwood | 235/381 |
| 4,798,322 | 1/1989 | Bernstein et al. | 235/487 |
| 4,916,296 | 4/1990 | Streck | 235/454 |
| 4,970,655 | 11/1990 | Winn et al. | 364/479 |
| 5,120,939 | 6/1992 | Claus et al. | 235/382 |
| 5,310,999 | 5/1994 | Claus et al. | 235/384 |

*Primary Examiner*—Harold Pitts
*Attorney, Agent, or Firm*—Steven R. Bartholomew

[57] ABSTRACT

Smart card techniques are disclosed for integrating and administering records related to the ownership and/or operation of motor vehicles. A smart identification card stores and administers a plurality of motor vehicle records corresponding to a single motorist. These motor vehicle records include items selected from the group of motor vehicle registration information, drivers license information, vehicle code violations, automobile insurance information, parking garage entry times, parking garage account balance, highway toll account balance, motor club information, and environmental inspection information. Each smart identification card is equipped to interact with any of a plurality of computer databases through the utilization of a conventional communications link in conjunction with a smart card scanner. Each of the computer databases administers motor vehicle records.

8 Claims, 27 Drawing Sheets

SMART IDENTIFICATION CARD DATA STRUCTURE

| | | |
|---|---|---|
| 131— | FILE IDENTIFIER "A": CARD HOLDER IDENTITY | DRIVERS LICENSE NUMBER —147 |
| 133— | FILE IDENTIFIER "B": CARD HOLDER IDENTITY | SOCIAL SECURITY NUMBER —149 |
| 135— | VIOLATION RECORD: | VIOLATION IDENTIFIER M —151<br>VIOLATION IDENTIFIER N —153<br>VIOLATION IDENTIFIER O —155 |
| 137— | TOLL ACCOUNT FILE IDENTIFIER: | TOLL ACCOUNT BALANCE —157 |
| 139— | PARKING GARAGE FILE IDENTIFIER: | PARKING GARAGE ACCOUNT BALANCE —159 |
| 141— | AUTOMOBILE INSURANCE POLICY FILE IDENTIFIER: | AUTOMOBILE X —161<br>POLICY EXPIRATION DATE —163<br>INSURANCE EXPIRATION FLAG —165<br>INSURANCE COMPANY TELEPHONE NUMBER —167 |
| 143— | AUTOMOBILE INSURANCE POLICY FILE IDENTIFIER: | AUTOMOBILE Y —169<br>POLICY EXPIRATION DATE —171<br>INSURANCE EXPIRATION FLAG —173<br>INSURANCE COMPANY TELEPHONE NUMBER —175 |
| 145— | DEPARTMENT OF MOTOR VEHICLES AUTOMOBILE REGISTRATION FILE IDENTIFIER: | VIN# OF AUTOMOBILE X —177<br>REGISTRATION EXPIRATION DATE —179<br>REGISTRATION EXPIRATION FLAG —181<br>INSPECTION DUE DATE —183<br>INSPECTION OVER DUE FLAG —185 |
| 146— | DEPARTMENT OF MOTOR VEHICLES AUTOMOBILE REGISTRATION FILE IDENTIFIER: | VIN# OF AUTOMOBILE Y —148<br>REGISTRATION EXPIRATION DATE —150<br>REGISTRATION EXPIRATION FLAG —152<br>INSPECTION DUE DATE —154<br>INSPECTION OVER DUE FLAG —156 |

FIG. 1

SMART IDENTIFICATION CARD DATA STRUCTURE

| | | |
|---|---|---|
| 131 — FILE IDENTIFIER "A": CARD HOLDER IDENTITY | DRIVERS LICENSE NUMBER | 147 |
| 133 — FILE IDENTIFIER "B": CARD HOLDER IDENTITY | SOCIAL SECURITY NUMBER | 149 |
| 135 — VIOLATION RECORD: | VIOLATION IDENTIFIER M<br>VIOLATION IDENTIFIER N<br>VIOLATION IDENTIFIER O | 151<br>153<br>155 |
| 137 — TOLL ACCOUNT FILE IDENTIFIER: | TOLL ACCOUNT BALANCE | 157 |
| 139 — PARKING GARAGE FILE IDENTIFIER: | PARKING GARAGE ACCOUNT BALANCE | 159 |
| 141 — AUTOMOBILE INSURANCE POLICY FILE IDENTIFIER: | AUTOMOBILE X<br>POLICY EXPIRATION DATE<br>INSURANCE EXPIRATION FLAG<br>INSURANCE COMPANY TELEPHONE NUMBER | 161<br>163<br>165<br>167 |
| 143 — AUTOMOBILE INSURANCE POLICY FILE IDENTIFIER: | AUTOMOBILE Y<br>POLICY EXPIRATION DATE<br>INSURANCE EXPIRATION FLAG<br>INSURANCE COMPANY TELEPHONE NUMBER | 169<br>171<br>173<br>175 |
| 145 — DEPARTMENT OF MOTOR VEHICLES AUTOMOBILE REGISTRATION FILE IDENTIFIER: | VIN# OF AUTOMOBILE X<br>REGISTRATION EXPIRATION DATE<br>REGISTRATION EXPIRATION FLAG<br>INSPECTION DUE DATE<br>INSPECTION OVER DUE FLAG | 177<br>179<br>181<br>183<br>185 |
| 146 — DEPARTMENT OF MOTOR VEHICLES AUTOMOBILE REGISTRATION FILE IDENTIFIER: | VIN# OF AUTOMOBILE Y<br>REGISTRATION EXPIRATION DATE<br>REGISTRATION EXPIRATION FLAG<br>INSPECTION DUE DATE<br>INSPECTION OVER DUE FLAG | 148<br>150<br>152<br>154<br>156 |

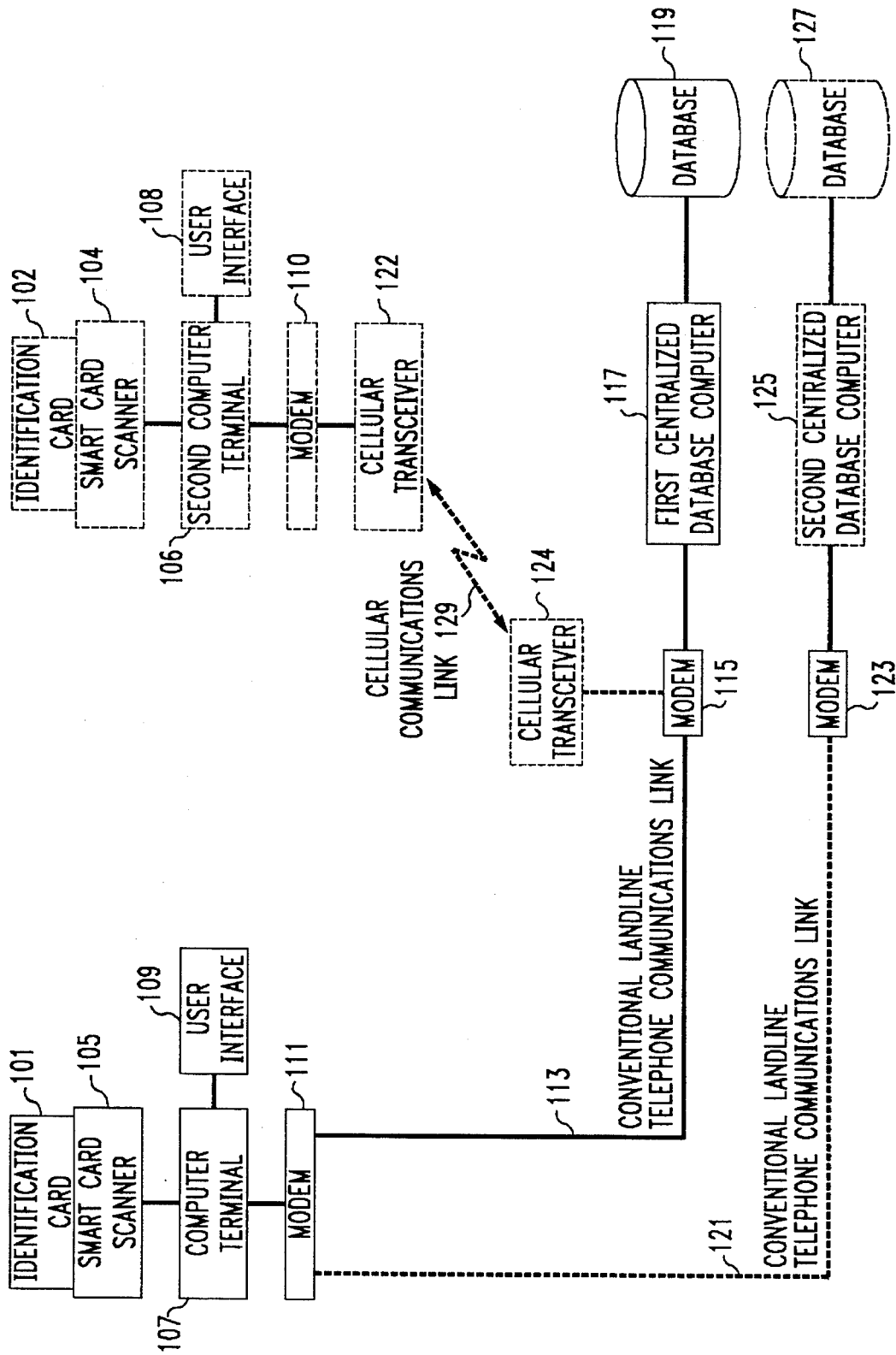

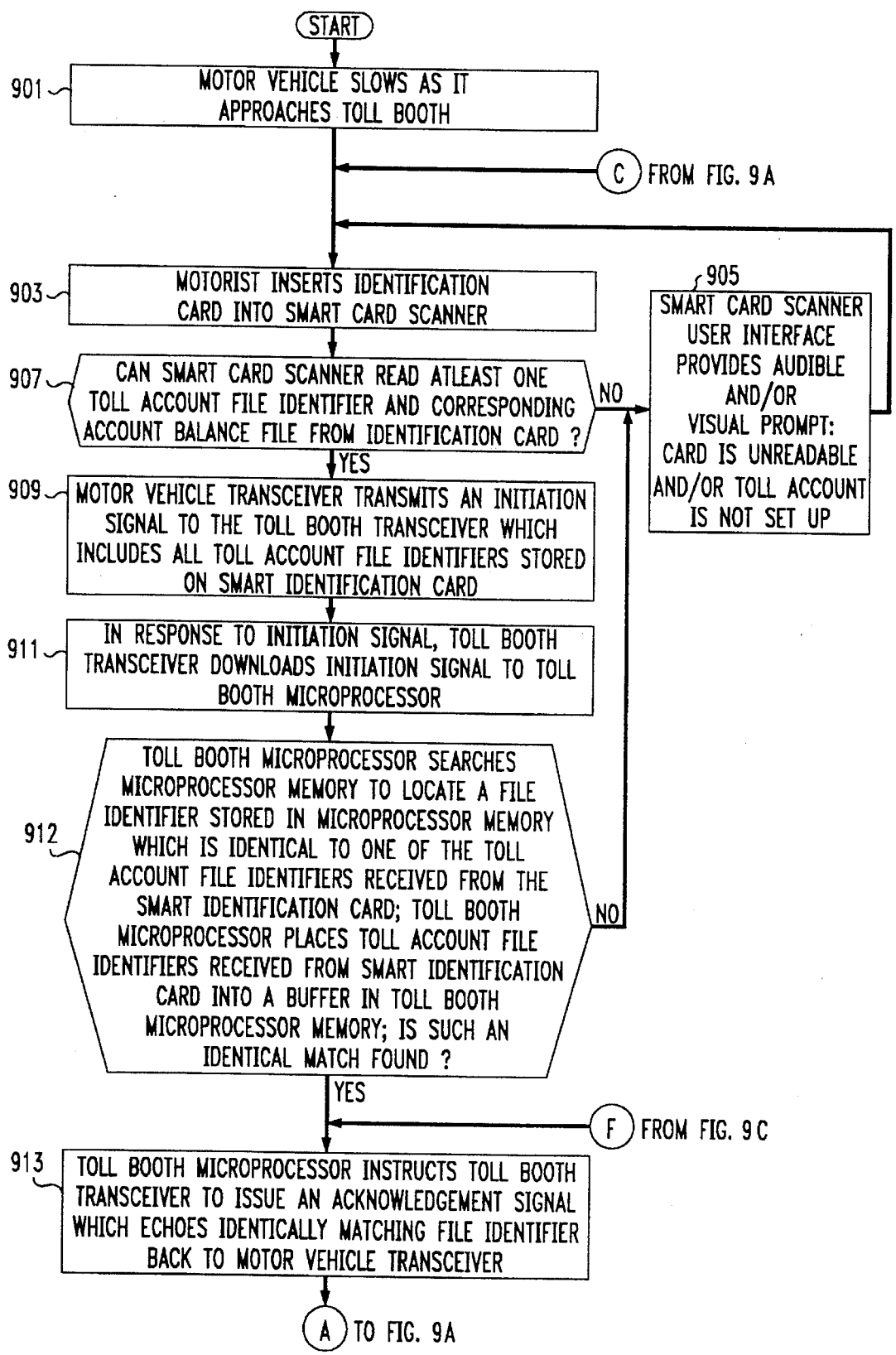

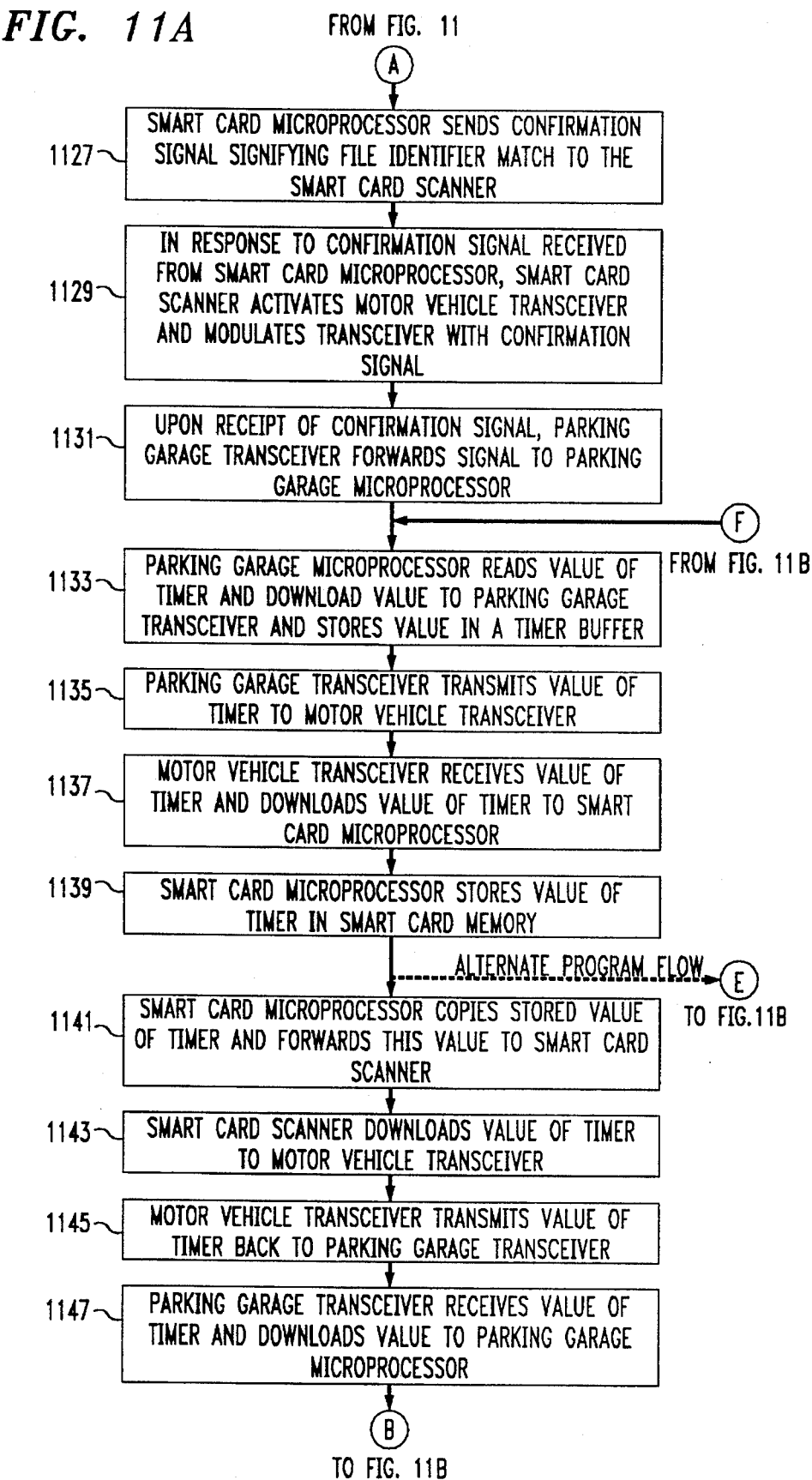

SMART CARD TECHNIQUES FOR MOTOR VEHICLE RECORD ADMINISTRATION

BACKGROUND OF THE INVENTION

1. Field of the Invention

The invention relates generally to smart cards, and more particularly to smart card techniques for use in conjunction with the administration of motor vehicle records.

2. Description of the Prior Art

Various prior art systems are directed towards improving one or more aspects of motor vehicle record administration. One such system, proposed by the Diebold Co., utilizes smart cards and a network of customer machines situated at fixed locations. The system is used by motorists who need to update their motor vehicle registrations, but do not wish to wait in long lines at the state Department of Motor Vehicles office. Each smart card stores a record setting forth motor vehicle registration parameters, and these records are updated by inserting the smart card into a large, stationary customer machine.

The use of stationary customer machines for the purpose of administering motor vehicle records is impractical in that a prohibitively large number of machines must be utilized to provide a reasonable level of service throughout a state or metropolitan area. If an insufficient number of machines are utilized, many vehicle owners will be situated closer to a conventional motor vehicle registration station than to a machine, and these owners are not very likely to drive the extra distance merely for the privilege of dealing with the machine. Moreover, such machines are expensive to manufacture and to maintain. An additional expense will have to be borne by the state and/or the taxpayers, because the state motor vehicle authority will have to purchase or lease the space on which the machines are to be located.

A significant shortcoming of prior art systems is that only one category of motor vehicle record is administered. For example, the Diebold system only provides for the administration of records dealing with motor vehicle ownership registration. It would be desirable to have a record administration system which is equipped to handle all types of record arising in connection with the ownership and operation of motor vehicles, such as drivers license registration, automobile insurance renewal, environmental inspection compliance, motor vehicle code violations, parking garage fee payments, and the payment of highway tolls. However, existing systems lack the data structures, process steps, and/or hardware to implement a fully integrated motor vehicle record administration system.

Another prior art system related to motor vehicle records is disclosed in U.S. Pat. No. 4,970,655 issued to Winn et al. on Nov. 13, 1990 for an Automatic Fee Collecting and Receipt Dispensing System. As with the Diebold system, the Winn system utilizes a network of customer machines. However, Winn does not utilize smart cards at all. Rather, the Winn customer machine functions in a manner analogous to that of a conventional vending machine, by dispensing customer-selected forms in exchange for monetary consideration. The customer provides monetary consideration for the forms by swiping a conventional credit or ATM card through a reader on the machine. The forms that are processed by Winn concern motor vehicle registration, and do not encompass other functions connected with the ownership and operation of motor vehicles. Accordingly, motorists can register their automobile ownership with the state, but the Winn system is not equipped to deal with automobile insurance, toll payments, or traffic violations.

For purposes of customer and administrative convenience, it would be desirable to have a system which fully integrates a plurality of records associated with automobile use and ownership. As stated above, present-day motor vehicle record administration systems are generally single-application systems equipped to process only one category of motor vehicle records. However, in view of recent technological and legal developments, such systems are in need of dramatic improvement. Along with the increased use of electronic automation, the proliferation of insurance and environmental regulations has dramatically increased the record-keeping burden imposed on motorists. A present-day automobile driver may be required to carry a drivers license card, one or more vehicle registration cards, a proof-of-insurance card, a motor club card, a toll-way authority pass card, a parking garage pass card, and an environmental inspection certificate. The requirement to carry around all of these cards is an inconvenience. These cards add weight and bulk to wallets and purses. Time is wasted fumbling around trying to find a desired card from among a myriad of other cards. Additionally, due to the sheer number of cards, the cards are rendered increasingly vulnerable to loss, misplacement, or theft; i.e., a card falling to the ground unnoticed while its owner is frantically searching for another card; a card sliding out of an already-overcrowded wallet; etc. Due to the relatively large number of cards, the loss or misplacement of one of the cards may go unnoticed until recovery of the card is difficult or impossible. What is needed is a system for integrating various types of motor vehicle records onto a single motorist identification card.

SUMMARY OF THE INVENTION

Smart card techniques are disclosed for integrating and administering records related to the ownership and/or operation of motor vehicles. A smart identification card stores and administers a plurality of motor vehicle records corresponding to a single motorist. These motor vehicle records include items selected from the group of motor vehicle registration information, drivers license information, vehicle code violations, automobile insurance information, parking garage entry times, parking garage account balance, highway toll account balance, motor club information, and environmental inspection information. Each smart identification card is equipped to interact with any of a plurality of computer databases through the utilization of a conventional communications link in conjunction with a smart card scanner. Each of the computer databases administers motor vehicle records.

BRIEF DESCRIPTION OF THE DRAWINGS

FIG. 1 sets forth the data structures utilized by a preferred embodiment of the smart identification card;

FIG. 2 is a hardware block diagram showing an illustrative operational environment for the smart identification card of FIG. 1;

FIG. 9 and 9a, 9b, 9c, 9d are flowcharts showing a procedure for use in conjunction with the hardware FIG. 8;

FIG. 11 and 11a, 11b, 11c, 11d are flowcharts showing a procedure for using in conjunction with the hardware of FIG. 10;

DETAILED DESCRIPTION OF THE PREFERRED EMBODIMENTS

Figure 3:
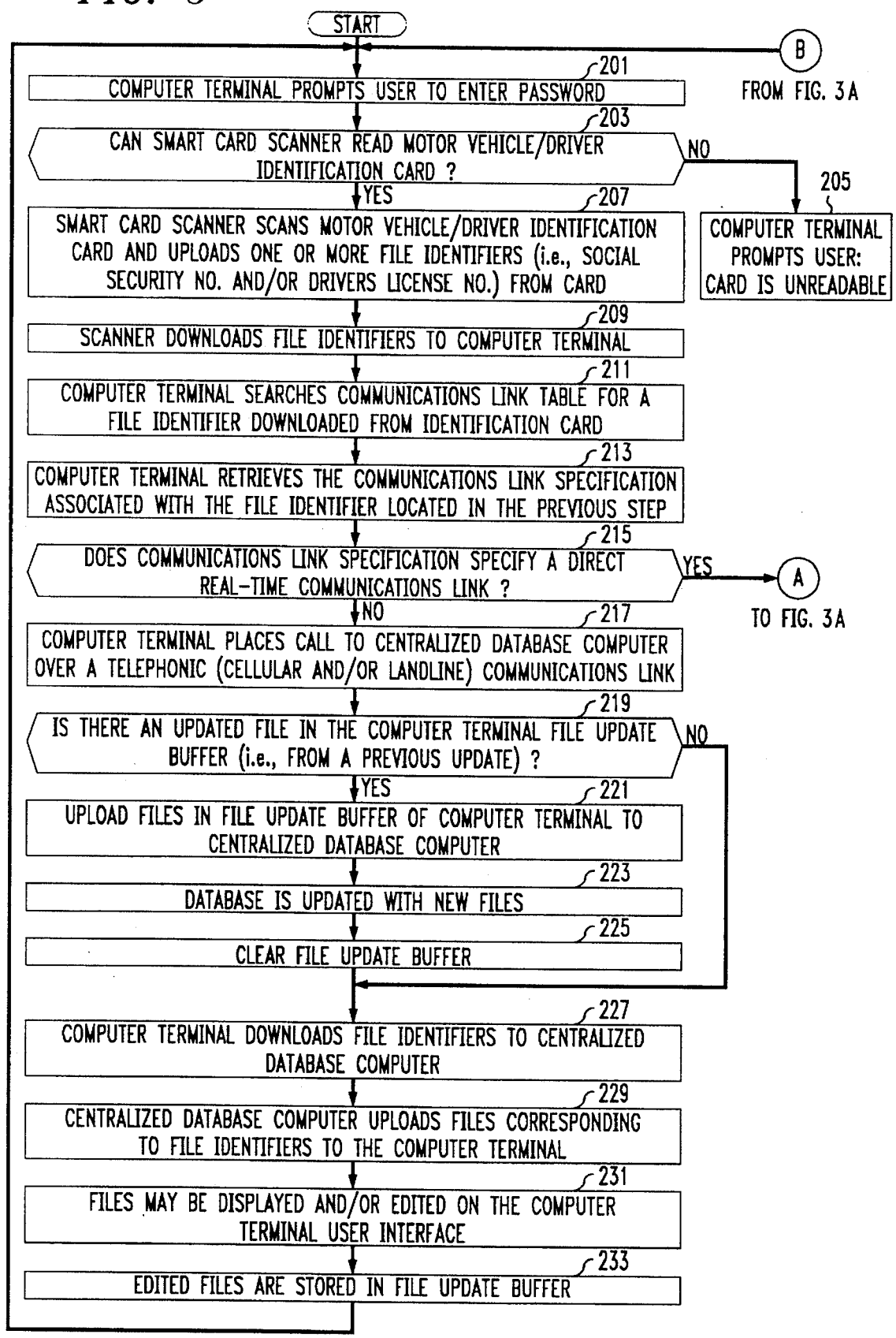
FIGS. 3 and 3A are a flowchart setting forth a procedure for use in conjunction with the hardware shown in FIG. 2.

FIG. 1 sets forth the data structures utilized by a preferred embodiment of the smart identification card. The smart identification card of FIG. 1 provides a system which integrates a plurality of records related to the ownership and/or operation of motor vehicles. Each smart identification card is equipped to interact with any of a plurality of computer databases through the utilization of a conventional communications link in conjunction with a smart card scanner. Interactions between the smart identification card and one or more computer databases provide for the administration of the aforementioned records, as will be described in more detail below with reference to FIG. 2.

Referring now to FIG. 1, a smart identification card stores and administers motor vehicle records corresponding to a particular motorist. These motor vehicle records include a plurality of item categories selected from the group of motor vehicle registration information, drivers license information, vehicle code violations, automobile insurance information, parking garage entry times, parking garage account balance, highway toll account balance, motor club information, and environmental inspection information. For example, FIG. 1 includes a File Identifier "A"—Cardholder Identity 131 field, which is used to store the drivers license number 147 of the identification card holder. Similarly, File Identifier "B"—Cardholder Identity 133 field is used to store the social security number of the identification card holder.

Although the example of FIG. 1 uses two fields to store information related to the identity of the identification card holder, this is shown for illustrative purposes. Any convenient number of fields may be employed to store information relating to the identity of the cardholder, so long as at least one field contains sufficient information to uniquely identify a particular cardholder from all other cardholders. The term "file identifier" is employed because the drivers license number 147 stored in the File Identifier "A"—Cardholder Identity 131 field may be used by a centralized computer as an index for the purpose of locating a particular record in a large database. Likewise, the File Identifier "B"—Cardholder Identity 133 field may also be employed as an index to locate a particular record in a centralized database external to the smart identification card. In this manner, the memory reserves of the smart identification card are economized, inasmuch as a relatively small file identifier stored in the smart identification card may be used to refer to a relatively lengthy record stored on a large mainframe computer.

The smart identification card of FIG. 1 contains a violation record file identifier 135 which uniquely identifies a vehicle code violation file stored in a centralized database maintained, for example, by a state drivers license recording bureau. The vehicle code violation file specified by the violation record file identifier 135 corresponds to the motorist having the drivers license number 147 specified in File Identifier "A"—Cardholder Identity 131 field, and the social security number 149 specified in the File Identifier "B"—Cardholder Identity 133 field. One or more violation identifiers may optionally be associated with the violation record file identifier 135. These violation identifiers correspond to a particular motor vehicle code violation or a particular category of motor vehicle code violation. For example, violation identifier M 151 corresponds to a vehicle code section prohibiting speeds in excess of 55 mph on state highways. Violation identifier N 153 corresponds to disobeying a traffic control device, i.e., by running through a red light, and violation identifier) 155 corresponds to parking in a handicapped zone.

Each violation identifier may optionally be associated with a date field setting forth the date of the violation, and a status field setting forth the legal status of the violation, i.e., awaiting trial, guilty verdict rendered with judgment satisfied, guilty verdict rendered with judgment not satisfied, and acquittal of all charges. The violation identifier may be used as an index, whereby the violation identifier is associated with a file in the state drivers license record bureau which contains more detailed and specific information about a particular vehicle code violation stored on the smart identification card. As will be described in more detail below with reference to FIG. 4, the smart identification card includes a data input device which is equipped to accept violation record identifiers 135 and/or violation identifiers 151, 153, 155 from mobile computers situated within police cars.

The smart identification card of FIG. 1 contains a toll account file identifier 137 which is associated with a toll account balance 157. The toll account identifier 137 is employed to uniquely identify a particular highway toll collection authority. These toll collection authorities are responsible for collecting tolls on one or more specific toll roads, bridges, and/or tunnels, such as the New Jersey Turnpike, the Northwest Tollway, the Coronado Bay Bridge, or the Lincoln Tunnel. Each toll account identifier is associated with a toll account balance 157 specifying the amount of money and/or the number of tolls remaining in the cardholder's account. As will be described hereinafter with reference to FIGS. 6 and 7, the toll account identifiers and toll account balances may be downloaded into the smart card from a centralized computing device under the control of a highway toll collection authority. Although the smart identification card of FIG. 1 shows one toll account file identifier, this is done for illustrative purposes only, it being understood that any convenient number of toll account file identifiers and corresponding account balances may be stored in the smart identification card.

A parking garage file identifier 139 is used to uniquely identify a specific parking garage or parking garage authority, such as the Lindbergh Field Parking Authority or the parking garage at Eighth and Walnut. Each parking garage file identifier 139 is associated with a parking garage account balance 159 specifying the amount of money, the amount of time, and/or the number of parkings remaining in the cardholder's account. Each parking garage file identifier 139 may also be associated with an optional time of entry field setting forth the time and/or date at which the cardholder entered the parking facility. The parking garage file identifier 139, parking garage account balance 159, and any optional time of entry fields may be downloaded into the smart identification card by a computing device under the control of the parking garage authority, as will be described in greater detail below with reference to FIGS. 10 and 11. Although the smart identification card of FIG. 1 includes one parking garage file identifier 139, it is to be understood that the smart identification card may contain any convenient number of parking garage file identifiers 139.

An automobile insurance file identifier 141 uniquely specifies an insurance company and an insurance policy file corresponding to the smart card holder and stored in a centralized computer database under the control of the specified insurance company. Each insurance policy file specifies a particular insurance policy, and may optionally include information concerning the terms of the policy, information related to the nature and status of insurance claims, personal information related to the policyholder, and information pertaining to motor vehicle code violations. The interactions between the smart identification card and the insurance company centralized computer database will be discussed at length below, with reference to FIGS. 12 and 13.

Returning now to FIG. 1, automobile insurance identifier 141 is associated with an automobile identification field 161 setting forth Automobile X, which may be a 1988 Thunderbird. Automobile insurance file identifier 143 is associated with an automobile identification field 169 setting forth Automobile Y, which may be a 1992 Crown Victoria. Each automobile insurance file identifier 141,143 is also associated with a policy expiration date field 163, 171, respectively, an insurance expiration flag 165, 173, respectively, and an insurance company telephone number field 167, 175, respectively. The policy expiration date fields 163, 171 set forth the expiration dates of the respective insurance policies referred to in automobile insurance identifiers 141 and 143.

Insurance expiration flags 165, 173 contains a first logic value, i.e., logic "one", when the insurance policy referred to in the corresponding automobile insurance identifier has not yet expired, and a second logic value, i.e., logic "zero", when the insurance policy has expired. The insurance company telephone number 167, 175 field contains a telephone number which is linked to the insurance company centralized computer database, and which is provided by the insurance company for the purpose of data communications. This telephone number may be accessed, for example, from a conventional cellular or landline telephonic device coupled to a modem.

A Department of Motor Vehicles Automobile Registration File Identifier 145 uniquely identifies a vehicle ownership registration file stored in a centralized computer database and administered by the state Department of Motor Vehicles. Such a file contains information related to the ownership of a specific motor vehicle, such as the owner's name, address, telephone number, age, and drivers license number; vehicle make, model, color, VIN (Vehicle Identification Number), and year; and other pertinent information.

Associated with Department of Motor Vehicles Automobile Registration File Identifier 145 is a VIN# 177 field which sets forth the VIN of automobile X (the 1988 Thunderbird), a registration expiration date 179 field which sets forth the motor vehicle registration expiration date, a registration expiration flag 181 (the registration expiration flag 181 is in a first logic state, i.e., logic "one" if registration has not expired, and is in a second logic state, i.e., logic "zero" if registration has expired), an inspection due date 183 field setting forth the deadline for the next upcoming environmental/safety inspection of the vehicle, and an inspection overdue flag 185 (the inspection overdue flag 185 is in a first logic state if the inspection date has already passed and the vehicle has not yet been inspected, and in a second logic state if the inspection date has not already passed and/or if the vehicle has already been inspected).

Although the example of FIG. 1 shows two Department of Motor Vehicles Automobile Registration Identifiers 145, 146, note that any number of Department of Motor Vehicles Automobile Registration File Identifiers 145, 146 may be stored on the smart identification card. As a practical matter, every vehicle owned by the smart identification card holder has a corresponding Department of Motor Vehicles Automobile Registration File Identifier 145, 146. If a smart identification card holder owns two motor vehicles, the smart identification card will contain two Department of Motor Vehicles Automobile Registration File Identifiers 145, 146. If the card holder owns six motor vehicles, then the smart identification card will contain six Department of Motor Vehicles Automobile Registration File Identifiers. Note that each Department of Motor Vehicles Automobile Registration File Identifier 146 includes a VIN# of Automobile 148 field, a registration expiration date 150 field, a registration expiration flag 152, an inspection due date 154 field, and an inspection overdue flag 156.

The data structures of FIG. 1 are directed to alleviating a currently-existing situation whereby motorists must carry separate drivers license cards, vehicle registration cards, proof-of-insurance cards, motor club cards, tollway authority pass cards, parking garage pass cards, and environmental inspection certificates. The data structures of FIG. 1 confer an additional benefit to motorists in cases where cards must be periodically renewed. The hardship of having to appear in person to wait in long lines for card renewals is eliminated, due to the fact that the FIG. 1 data structures have been developed for record administration via conventional communication links. In this manner, motorists can save time by updating their motor vehicle records at remote locations. Additionally, the inconvenience of having to carry around a multiplicity of cards to operate a motor vehicle is dramatically reduced, if not eliminated altogether. Excess weight, bulk, and confusion is eliminated from wallets and purses. The time that would otherwise be spent fumbling around trying to find a desired card from among a myriad of other cards is now time saved. Since it is much easier to keep track of one card as opposed to several cards, an integrated identification card is less vulnerable to loss, misplacement, or theft, as might occur when a card falls to the ground unnoticed while its owner is frantically searching for another card, or when a card gradually slips out of a bulging, overcrowded wallet. With an integrated identification card, it is very likely that the loss or misplacement of the card would not unnoticed for very long.

FIG. 2 is a hardware block diagram showing an illustrative operational environment for the smart identification card of FIG. 1. A smart identification card 101 is adapted for interfacing with a smart card scanner 105. Smart card scanner 105 includes a first communications interface which is equipped to communicate with the smart identification card 101. Such a first communications interface includes a smart card holder which is positioned in proximity to the smart identification card when data communications are desired. Accordingly, the smart card scanner 105 may hold the smart identification card in a substantially stationary position while data communications are taking place, as contrasted with conventional sweeper-type devices for credit cards, which are read-only devices and do not provide for bi-directional data communications. The design and construction of a suitable smart card scanner 105 is a matter well known to those skilled in the art.

Smart card scanner 105 includes a second communications interface for communicating with a computing device such as a computer terminal 107 and/or a microprocessor-based device. Computer terminal 107 may be a conventional personal computer. The computer terminal 107 is coupled to a user interface 109, which may include a conventional keyboard and a conventional video display device. Computer terminal 107 is also coupled to a conventional modem 111 adapted to communicate data over one or more conventional landline telephone communications links 113, 121.

The computer terminal 107 includes a conventional memory device (random-access memory —RAM, read-only memory —ROM, and/or a data storage drive), into which is loaded a communications link table. The memory is organized to include a file update buffer for storing one or more files until such time as the file(s) is (are) transmitted from the computer terminal over a communications link. The communications link table contains a list of file identifiers. Each file identifier is associated with a communications link specification setting forth a category of communications link, and an access address for the communications link. Illustrative categories of communication links include direct, dedicated, real-time, hardwired links; conventional landline telephonic links; conventional cellular telephonic links; point-to-point microwave links; and the like. The access address sets forth information which is sufficient to uniquely specify a given communications link. For example, in the case of a conventional landline or cellular telephonic link, the access address would include the telephone number of the link. In the case of a direct, dedicated, real-time, hardwired link, the access address would include a network address and/or the address of a communications port which couples the hardwired link to the computer terminal.

Conventional landline telephone communications links 113, 121 are each coupled to a corresponding centralized database computer such as first centralized database computer 117 and second centralized database computer 125, respectively, via respective modems 115, 123. First centralized database computer 117 administers database 119, and second centralized database computer 125 administers database 127.

Taken together, smart card scanner 105, computer terminal 107, user interface 109, and modem 111 may be conceptualized as a remotely-situated user terminal. The system of FIG. 2 includes a second remotely-situated user terminal adapted to communicate with smart identification card 102. This second remotely-situated user terminal includes a conventional smart card scanner 104, a conventional computer terminal 106, a conventional user interface 108 for the computer terminal 106, a conventional modem 110, and a conventional cellular transceiver 122 adapted for communications over a cellular communications link 129. The cellular communications link 129 may be coupled via a cellular carrier to a landline carrier which directs communications over a conventional landline telephone line to modem 123. Alternatively, the cellular communications link 129 may communicate with a cellular transceiver 124 coupled to modem 115.

The system of FIG. 2 may be advantageously utilized in the context of a state motor vehicle inspection system. These systems typically provide several vehicle inspection stations within a given metropolitan area. Such inspections are often time-consuming because vehicle and personal information must be manually gathered from the vehicle owner, usually by means of a paper form. The vehicle must be inspected, and the results of the inspection forwarded to a centralized state database along with the information gathered from the vehicle owner.

In the example of FIG. 2, smart card scanner 105, computer terminal 107, user interface 109, and modem 111 are situated at a first motor vehicle inspection station in the Northern suburbs of a metropolitan area. Smart card scanner 104, computer terminal 106, user interface 108, modem 110, and cellular transceiver 122 are situated at a second motor vehicle inspection station in the Western suburbs of a metropolitan area. Cellular transceiver 124, modem 115, first centralized database computer 117, and database 119 are situated at the state capital, hundreds of miles away from the aforementioned metropolitan area. Modem 123, second centralized database computer 125, and database 127 are located at the headquarters of the Environmental Protection Agency in Washington, D.C.

Figure 3A:
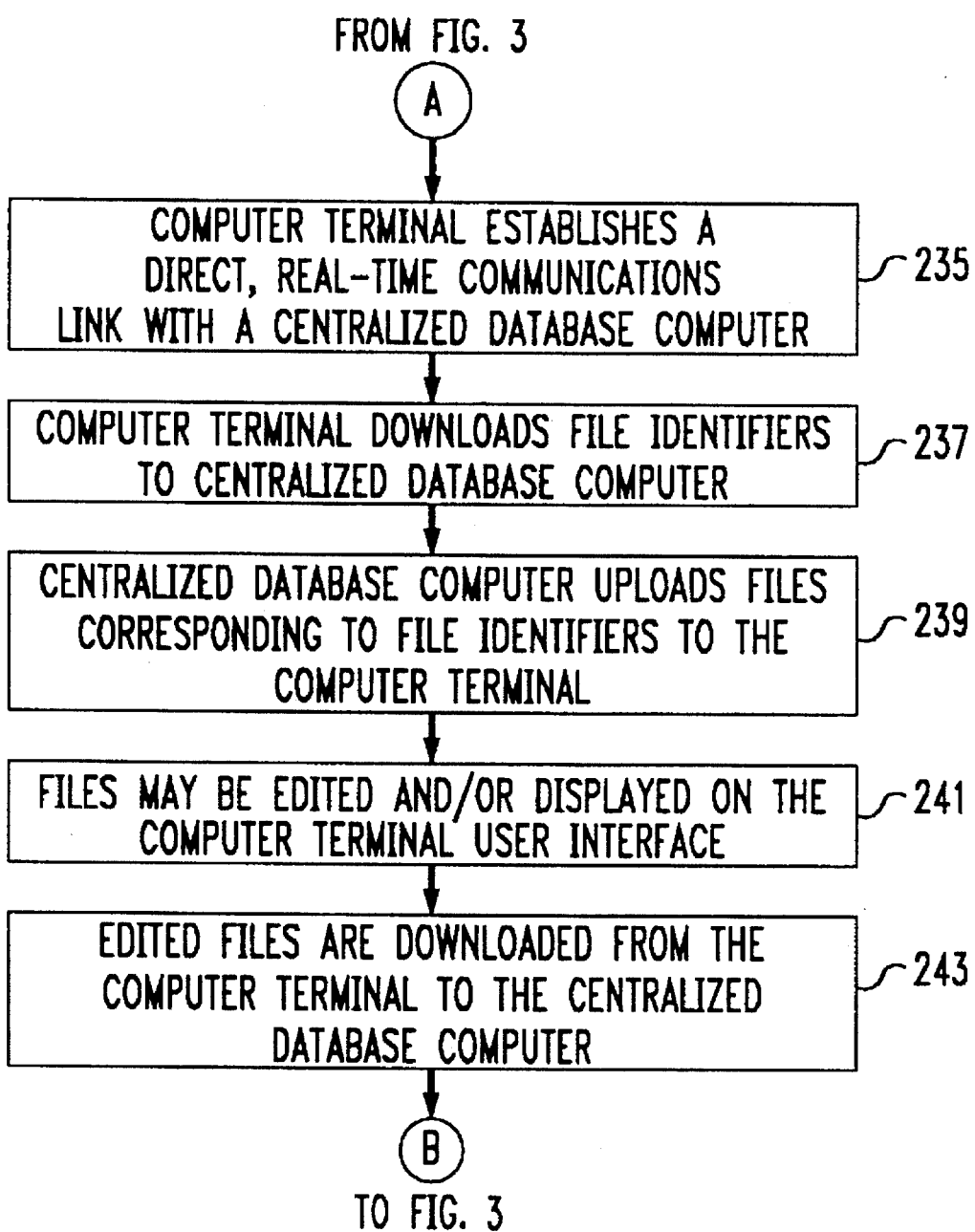

FIGS. 3 and 3A are a flowchart setting forth a procedure for use in conjunction with the hardware shown in FIG. 2. Program control begins at block 201 where the computer terminal (FIG. 1, 107) prompts the user to enter a password into the user interface (FIG. 1, 109). At block 203, a test is performed to ascertain whether or not the smart card scanner (FIG. 1, 105) can read the smart identification card. If not, the program branches to block 205, where the user interface prompts the user that the smart identification card is unreadable, and the program then terminates.

The affirmative branch from block 203 leads to block 207, where the smart card scanner scans the smart identification card and uploads one or more file identifiers from the card. These file identifiers may include, for example, the social security number and/or the drivers license number stored on the smart identification card, as was previously described in connection with FIG. 1. The smart card scanner downloads the file identifiers to the computer terminal in block 209. At block 211, the computer terminal searches a communications link table for the file identifier which was downloaded in block 209. The computer terminal retrieves the communications link specification associated with this file identifier (block 213). At block 215, a test is performed to ascertain whether or not the communications link specification sets forth a direct, real-time communications link. If so, the program jumps ahead to block 235, where a series of operations is implemented as will be described in greater detail below.

The negative branch from block 215 leads to block 217, where the computer terminal places a call via the modem to a centralized database computer over a telephonic (cellular and/or landline) communications link. Next, the computer terminal checks to see whether or not there is an updated file in the computer terminal file update buffer (block 219). A file will be in the file update buffer if the routine of FIG. 3 has been previously executed and, during such previous execution, an edited file was placed in the file update buffer at block 233. If there is an updated file in the file update buffer, the program progresses to block 221, and if there is not an updated file in the file update buffer, the program skips ahead to block 227.

At block 221, the file or files in the file update buffer are uploaded to the centralized database computer via modems over the communications link. The centralized database computer updates the database with the file(s) which were uploaded from the file update buffer (block 223). At block 225, the file update buffer is cleared.

Block 227 is executed as program control transfers from block 225 or, alternatively, if the negative branch of block 219 is followed. At block 227, the computer terminal downloads file identifiers to the centralized database computer. The centralized database computer uploads, from the database, the files corresponding to the file identifiers. These files are uploaded to the computer terminal (block 229). These files may now be displayed and/or edited on the computer terminal user interface. After file editing, the edited files are stored in the file update buffer (block 233), and the program loops back to block 201.

The affirmative branch from block 215 leads to block 235 (FIG. 3A). At block 235, the computer terminal establishes a direct, real-time communications link with the centralized database computer. This communications link may be a conventional hardwired data line such as, for example, a T1 line. The computer terminal downloads the file identifiers to the centralized database computer (block 237). The centralized database computer uploads files corresponding to the file identifiers. These files are uploaded to the computer terminal (block 239). The files may be displayed and/or edited on the computer terminal user interface (block 241). The edited files are downloaded from the computer terminal to the centralized database computer (block 243). The program then loops back to block 201.

Figure 4:
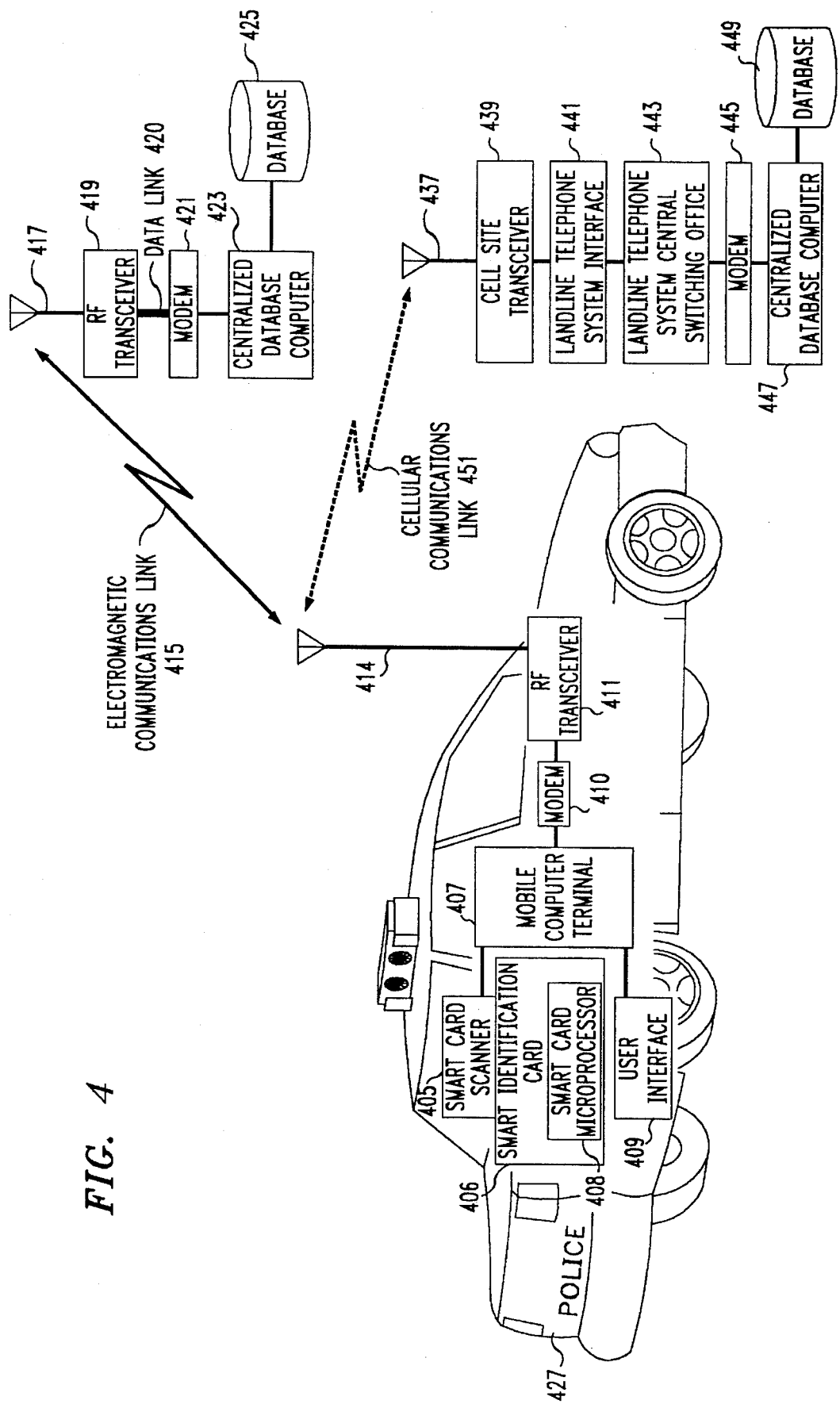
FIG. 4 is a hardware block diagram showing a smart identification card system for use in connection with law enforcement operations.

FIG. 4 is a hardware block diagram showing a smart identification card system for use in connection with law enforcement operations. A law enforcement vehicle, such as police car 427, is equipped with a mobile computer terminal 409, to which is coupled a smart card scanner 405 and a user interface 409. The smart card scanner 405, user interface 409, and mobile computer terminal 407 are similar to smart card scanner 105 (FIG. 1), user interface 109, and computer terminal 107, respectively, with an additional requirement that smart card scanner 405, user interface 409, and mobile computer terminal 407 should be adapted to operate from a conventional vehicular power supply of 13.8 volts (nominal). The mobile computer terminal 407 is coupled to a modem 410 which interfaces with an RF transceiver 411. Mobile computer terminal 407 may comprise, for example, a laptop computer adapted for mounting in a law enforcement vehicle. Mobile computer terminal 407 includes memory, which is any desired combination of RAM, ROM, and/or data storage drives. Memory is organized to include a file update buffer equipped to store one or more flies for the purpose of editing and/or reading the file(s).

User interface 409 may comprise any desired combination of a video display, an alphanumeric display, a voice synthesis circuit, a keyboard, a printer, or the like. Smart card scanner 405 is adapted to perform read/write operations on a smart card such as smart identification card 406. Smart identification card 406 includes a smart card microprocessor 408.

RF transceiver 411 may be a conventional police radio transceiver which operates on one or more federally-assigned frequencies in the public service bands. Alternatively, RF transceiver 411 may be a conventional cellular radio transceiver. RF transceiver 411 is coupled to a vehicular antenna 414 of a conventional design which operates over the frequency range or ranges covered by RF transceiver 411.

In the case where RF transceiver 411 is a conventional police radio transceiver, antenna 414 communicates with base station antenna 417 over a conventional electromagnetic communications link 415. The base station antenna 417 may actually consist of one or more antennas, physically located at one or more locations, which are used by the police department to communicate with vehicles out in the field. The base station antenna is coupled to RF transceiver 419, which is a conventional base station transceiver equipped to operate on one or more federally-assigned public service channels for communication with RF transceiver 411. RF transceiver 419 includes an integral data modulator/demodulator which demodulates received data signals and converts these data signals into a form suitable for transmission over data link 420. The data modulator/demodulator also modulates signals received over data link 420 into a form suitable for transmission over antenna 417.

Data link 420 may comprise a dedicated, hardwired communications link, a conventional telephonic communications link, a microwave point-to-point link, a combination of the aforementioned links, or the like. This link connects RF transceiver 419 to a conventional modem 421, which modem may be situated at a remote location relative to RF transceiver 419. The modem 421 is connected to a centralized database computer 423 which administers database 425.

If RF transceiver 411 is a cellular transceiver, antenna 414 communicates with cell site antenna 437 over a conventional cellular radio communications path. Cell site antenna 437 is coupled to a conventional cell site transceiver 439, which is equipped to provide a communications path between RF transceiver 411 and a landline telephone system interface 441. The landline telephone system interface 441 provides a link between cell site transceiver 439 and a conventional landline telephone system central switching office 443. The central switching office 443 is adapted to communicate over conventional telephonic links. A standard modem 445 is coupled via a conventional telephonic link to the landline telephone system central switching office 443. The modem 445 is coupled to a centralized database computer 447 having a database 449. Cellsite transceiver 439 is coupled to cell site antenna 437, which is the antenna at the cell site accessed by the RF transceiver 411. Modem 445, centralized database computer 447, and database 449 are conventional devices.

Figure 5:
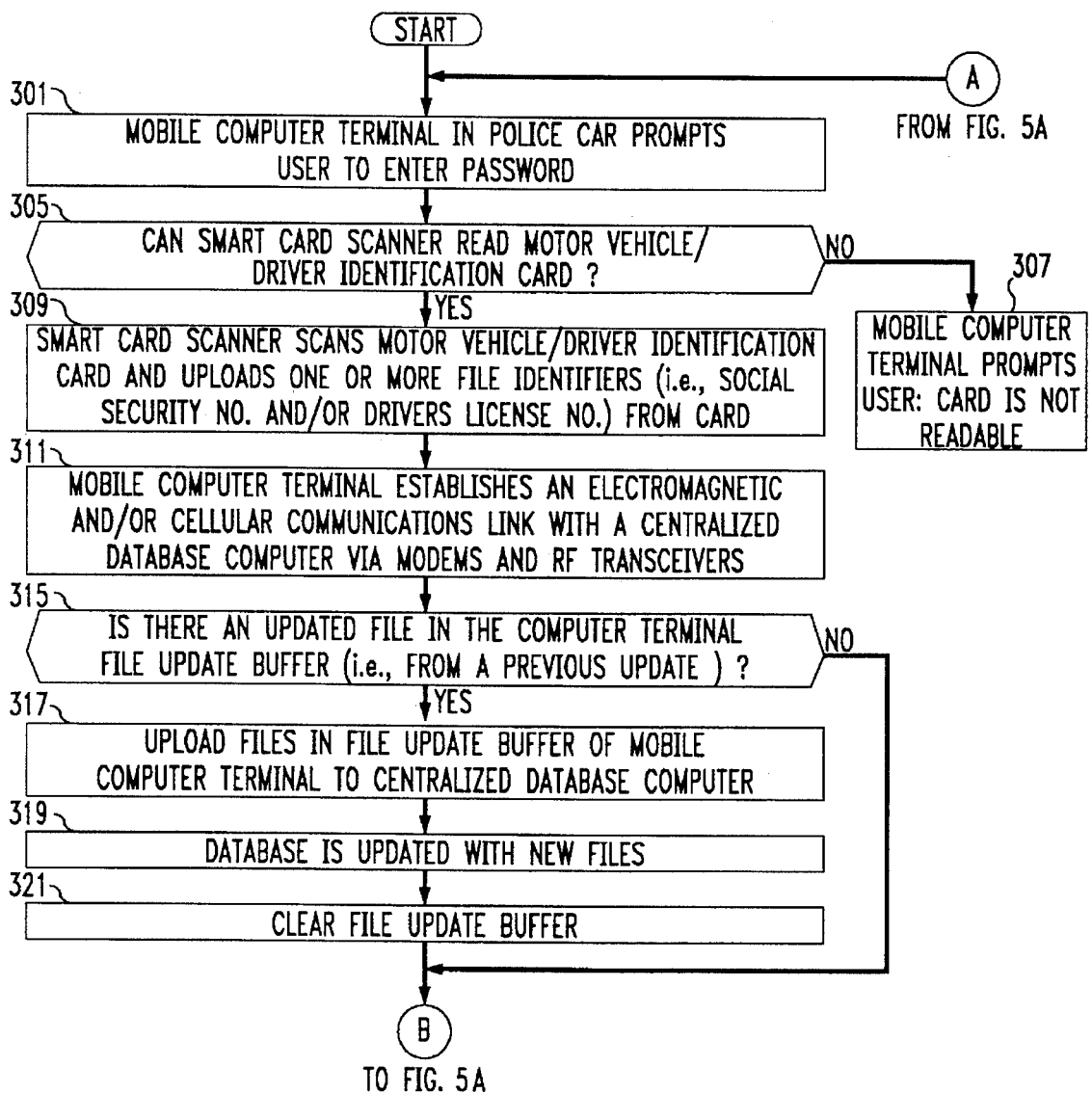
FIG. 5 and 5a are flowcharts setting forth a procedure for use in conjunction with the hardware shown in FIG. 4.
Figure 5A:
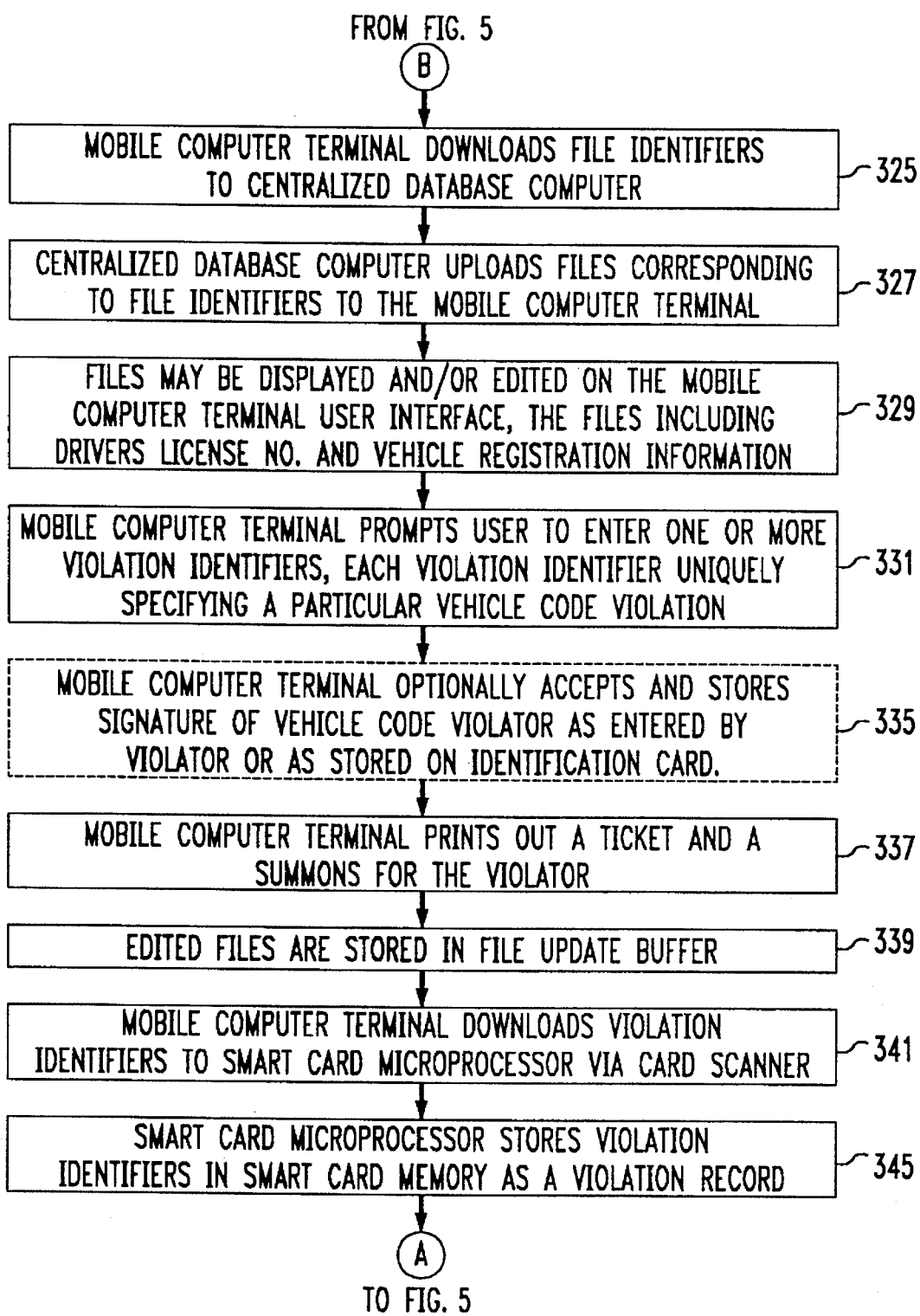

FIG. 5 is a flowchart setting forth a procedure for use in conjunction with the hardware configuration of FIG. 4. The procedure is applied when a law enforcement officer stops a motorist who allegedly violated one or more vehicle code provisions. The officer asks the alleged violator to provide his or her smart identification card, and the procedure of FIG. 5 then commences. At block 301, the mobile computer terminal in the police car prompts the user (i.e., a law enforcement officer) to enter a password into the user interface connected to the mobile computer terminal, and to place a smart identification card into the smart card scanner. At block 305, the program tests to see whether the smart card scanner can read the smart identification card. If not, the user interface connected to the mobile computer terminal prompts the officer: the smart identification card is not readable.

If the smart identification card is readable, program control progresses to block 309, where the smart card scanner scans the smart identification card and uploads one or more file identifiers (i.e., social security number and/or drivers license number) from the smart identification card. At block 311, the mobile computer terminal establishes an electromagnetic communications link with a centralized database computer via modems and RF transceivers, as was discussed in connection with FIG. 4. The mobile computer terminal implements a test at block 305 to determine whether there is an updated file in the mobile computer terminal file update buffer. If there is an updated file in the file update buffer, the program progresses to block 317, where the file(s) in the file update buffer are uploaded from the buffer to the centralized database computer. The centralized database computer then updates the database (block 319) with the new files which were uploaded from the buffer in the previous step. The file update buffer is cleared at block 321, and the program progresses to block 325.

Block 325 is reached directly from block 321 or, alternatively, upon execution of the negative branch at block 315. At block 325, the mobile computer terminal downloads the file identifiers previously received from the smart identification card to the centralized database computer. The centralized database computer uploads any files corresponding to the file identifiers to the mobile computer terminal (block 327). These file(s) are placed into the file update buffer, and may now be displayed and/or edited (block 329). The files may be displayed or edited using the mobile computer terminal user interface. Typical files would include, for example, drivers license number, drivers license information (height, weight, etc.), the driving record corresponding to the drivers license number, vehicle registration information, and/or automobile insurance information.

Next, the mobile computer terminal prompts the officer to enter one or more violation identifiers (block 331). Each violation identifier corresponds to and uniquely specifies a particular vehicle code or other law violation. The mobile computer terminal user interface may optionally display or read for the officer a brief description of the violation identifier so as to enable the officer to select the most appropriate violation identifier(s) for a given situation. At block 335, the mobile computer terminal user interface optionally accepts and stores the signature of the alleged vehicle code violator as entered by the violator on the mobile computer terminal user interface, or as stored on the smart identification card of the alleged violator. At block 337, the mobile computer terminal user interface prints out a ticket and optionally a summons for the alleged violator. The edited files corresponding to the alleged violator are stored in the file update buffer (block 339). The mobile computer terminal downloads the violation identifiers to the smart identification card microprocessor via the smart card scanner (block 341). The smart identification card microprocessor stores the violation identifiers in smart identification card memory as a violation record in a section of smart identification card memory reserved by the smart identification card microprocessor for this purpose (block 345). The program then loops back to block 301.

Figure 6:
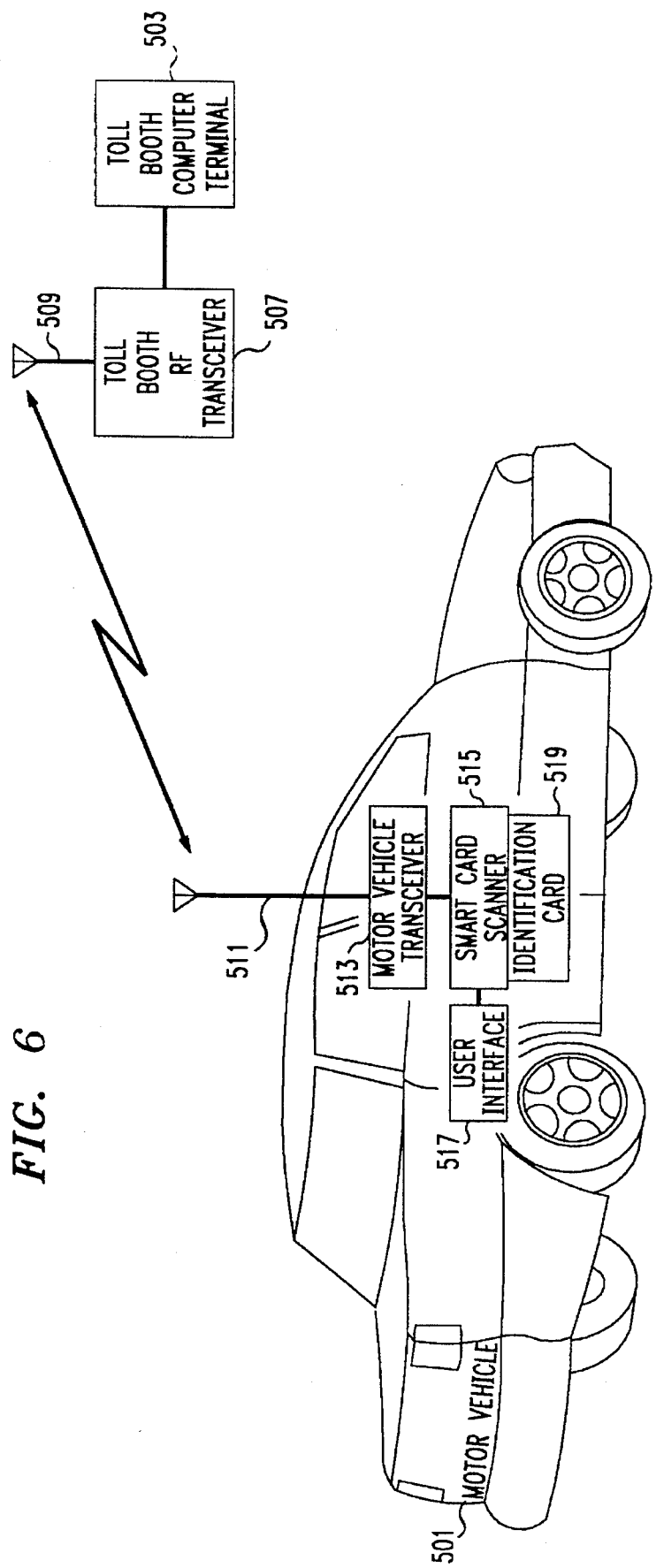
FIG. 6 is a hardware block diagram showing a first embodiment of a smart identification card system for collecting highway tolls.

FIG. 6 is a hardware block diagram showing a first embodiment of a smart identification card system for collecting highway tolls. The system includes a toll booth computer terminal 503 linked to a toll booth transceiver 507. The toll booth computer terminal 503 may be a conventional personal computer, a network of personal computers interconnected via a local-area network (LAN), a mainframe computer system, or the like. Toll booth computer terminal 503 includes a central processing unit and one or more user interface devices such as keyboards and display screens.

Toll booth computer terminal 503 need not be situated at a single discrete location; portions of toll booth computer terminal 503 may be situated within toll booths, the toll booth area, a structure near the toll collection area, and/or at remote locations far removed from the toll collection area. For example, every toll booth could be equipped with a user interface device (keyboard and video display), hardwired to the central processing unit which is housed in an office building near the toll collection area. In the case where some portions of the toll booth computer terminal 503 are situated at remote locations, these portions may be linked to the remaining portions of toll booth computer using conventional communications links.

Toll booth computer terminal 503 is linked to toll booth RF transceiver 507 via a conventional hardwired communications link, a telephonic communications link, an electromagnetic communications link, or any convenient combination of the aforementioned links. Toll booth transceiver 507 may actually represent a plurality of RF transceivers, such that every toll booth is equipped with its own RF transceiver. The RF transceivers may be equipped to operate on a plurality of frequencies, such that simultaneous operation of a plurality of transceivers is possible without mutual interference. For example, each toll booth could utilize its own dedicated set of transmit and receive frequencies. Toll booth transceiver 507 is coupled to a toll booth antenna 509 which may represent a master antenna system for all toll booths in a given toll collection area or, alternatively, antenna 509 may represent a plurality of antennas, wherein each toll booth is equipped with its own dedicated antenna.

Motor vehicles are equipped with a motor vehicle transceiver 513 coupled to a motor vehicle antenna 511. The motor vehicle transceiver 513 is designed to operate on frequencies which are compatible with those utilized by toll booth RF transceiver 507. In the case where toll booth RF transceiver 507 is adapted to operate on a plurality of frequencies, this transceiver may be programmed to transmit periodic interrogation signals on a currently vacant channel. The motor vehicle transceiver 513 is then programmed to scan across all radio channels assigned to the toll collection system, tuning to the channel providing the strongest interrogation signal. In the case where it is desired to program the toll booth RF transceiver 507 and the motor vehicle transceiver 513 as mentioned immediately above, then these transceivers should be equipped with microprocessor control. The functioning and design of such RF transceivers is a matter well-known to those skilled in the art; suitable transceivers are available from companies such as Motorola, OKI, and Uniden.

Motor vehicle transceiver 513 is coupled to a smart card scanner 515 which may be identical to the smart card scanner 105 described previously in connection with FIG. 2. This smart card scanner 515 is adapted to perform data read/write operations on identification card 519. A user interface 517 is connected to the smart card scanner 515, which may include any combination of a keyboard, a video display, an alphanumeric display, an audio signal generator, and a voice synthesis circuit. The motor vehicle transceiver 513, smart card scanner 515, and user interface 517 are situated within a conventional motor vehicle 501.

Figure 7:
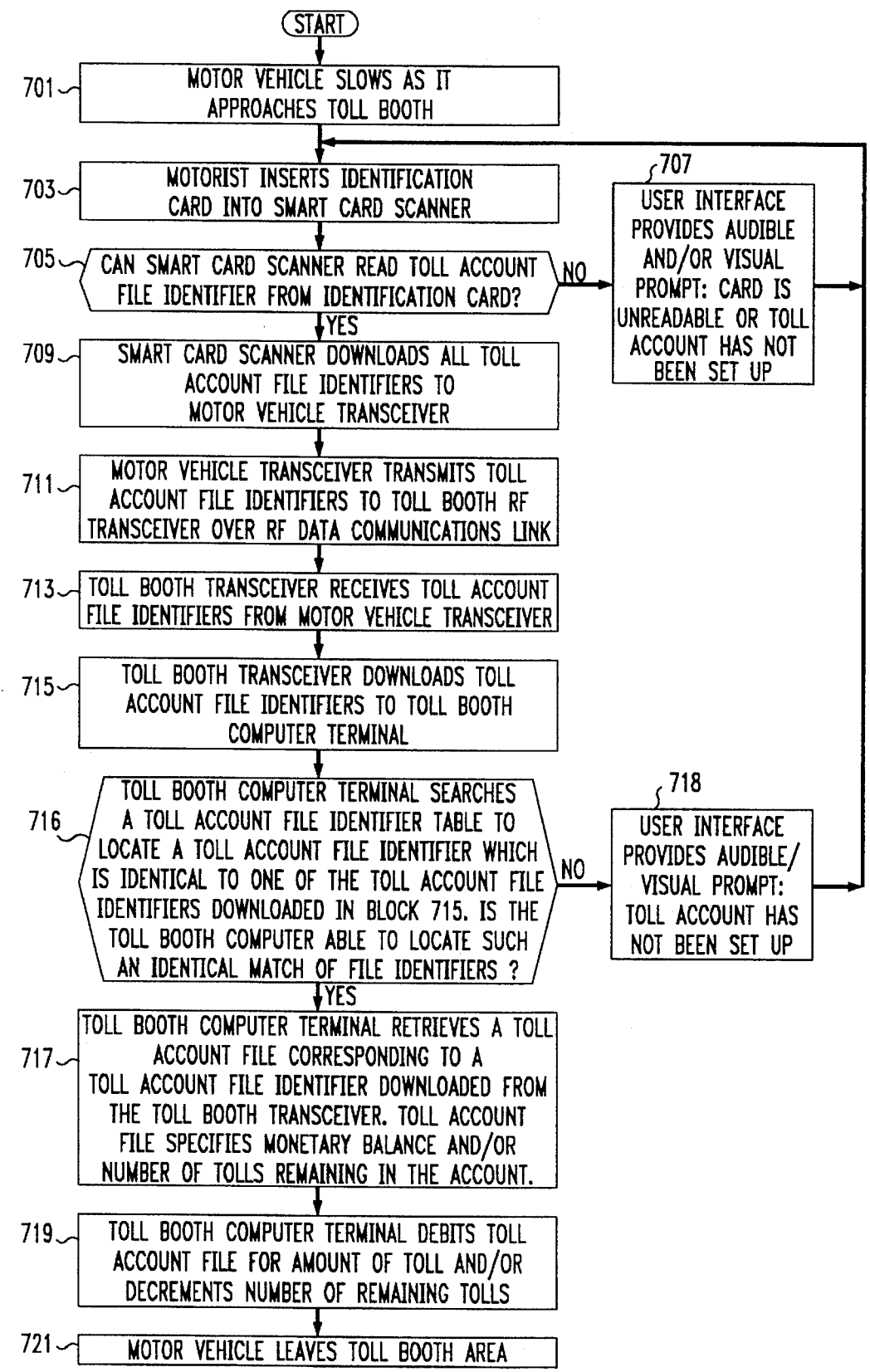
FIG. 7 is a flowchart setting forth a procedure for use in conjunction with the hardware of FIG. 6.

FIG. 7 is a flowchart setting forth a procedure for use in conjunction with the hardware of FIG. 6. The program commences at block 701, where the motor vehicle slows as it approaches a toll booth. The motorist then inserts an identification card (FIG. 6, 519) into the smart card scanner (FIG. 6, 515). At block 705, a test is performed to ascertain whether or not the smart card scanner can read one or more toll account file identifiers from the identification card. If the smart card scanner cannot read any toll account file identifiers from the smart card, the negative branch from block 705 is followed to block 707, where the user interface provides an audible and/or visual prompt that the identification card is unreadable and/or a toll payment account has not been installed on the smart identification card, and the program loops back to block 703.

The affirmative branch from block 705 leads to block 709, where the smart card scanner downloads all toll account file identifiers from the identification card to the motor vehicle transceiver. The motor vehicle transceiver transmits the toll account file identifiers to the toll booth transceiver over an RF data communications link (block 711). The toll booth transceiver receives the toll account file identifiers from the motor vehicle transceiver (block 713), and the toll booth transceiver then downloads the toll account file identifiers to the toll booth computer terminal (block 715).

The toll booth computer terminal searches a toll account file identifier table to locate a toll account file identifier which is identical to one of the toll account identifiers downloaded into the toll booth computer terminal (block 716). The toll account file identifier table associates toll account file identifiers with corresponding toll accounts. The program progresses to block 717 once an identical match of file identifiers is found. For purposes of the present example, if one identical match of file identifiers is found, the program does not search for matches for the remaining toll account file identifiers downloaded from the smart identification card. Rather, upon the occurrence of the first file identifier match, program control progresses to block 717. However, if the program fails to find matches for any of the toll account file identifiers downloaded from the smart identification card, program control is diverted to block 718, where the user interface provides an audible and/or visual indication that a toll account has not been set up.

At block 717, the toll booth computer retrieves a toll account file corresponding to the toll account file identifier which was matched in block 716. The toll account file specifies a monetary balance and/or the number of tolls remaining in the account. The toll booth computer terminal debits the toll account file retrieved in block 717 for the amount of the toll and/or decrements the number of remaining tolls (block 719). The motor vehicle then leaves the toll booth area (block 721), and the program re-executes for the next motor vehicle in line, starting back at block 701.

Note that the sequence of operations implemented in FIG. 7 characterize a toll payment system where the toll account balance is stored in the toll booth computer terminal. However, it is also possible to store the toll account balance on the smart identification card as opposed to, or in addition to, storing the toll account balance in the toll booth computer terminal. The procedure of FIG. 7 provides the toll authority with the greatest amount of oversight and control over toll collection operations, and may serve to minimize fraud. However, the system to be described in conjunction with FIGS. 8 and 9 stores the toll account balance on the smart identification card and not in the toll booth computer terminal. This approach has the advantage of simplifying record-keeping and reducing the expense and the hardware requirements of that portion of the system for which the toll collection agency has administrative responsibility.

Figure 8:
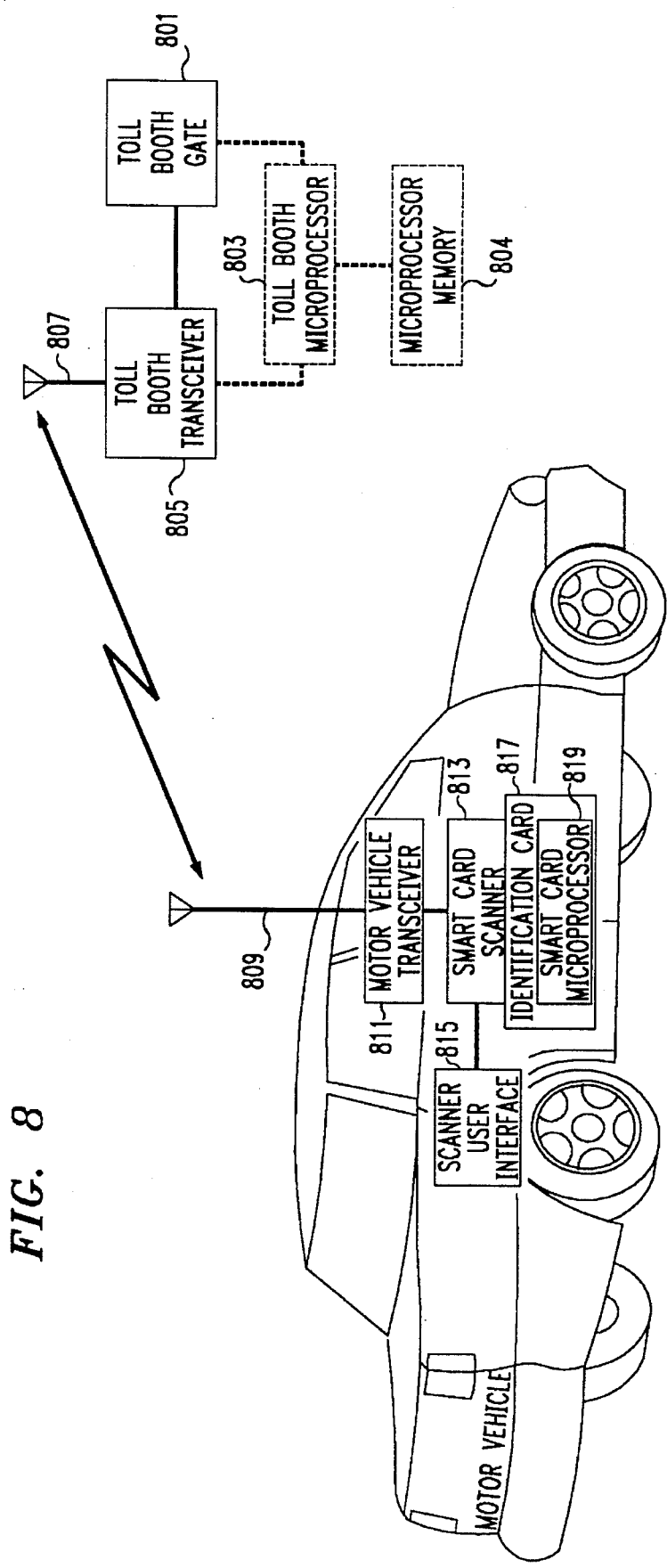
FIG. 8 is a hardware block diagram showing a second embodiment of a smart identification card system for collecting highway tolls.

FIG. 8 is a hardware block diagram showing a second embodiment of a smart identification card system for collecting highway tolls, wherein the toll account balance is stored on the smart identification card. A toll booth is equipped with a toll booth gate 801, and a toll booth transceiver 805 coupled to a toll booth antenna 807. The toll booth gate 801 and the toll booth transceiver 805 are placed under the control of a toll booth microprocessor 803 coupled to microprocessor memory 804.

A motor vehicle adapted for use with the toll collection system of FIG. 8 includes a motor vehicle transceiver 811 coupled to a motor vehicle antenna 809. The motor vehicle transceiver 811 is equipped for communications with the toll booth transceiver 805, and is coupled to a smart card scanner 813. Smart card scanner 813 may be substantially identical to the smart card scanner 105 described in connection with FIG. 2. The smart card scanner 813 is coupled to a scanner user interface 815 which includes humanly discernible visual and/or audio indicating devices such as, for example, an alphanumeric display, a video display screen, indicator lamps, a voice synthesis circuit, and audio oscillators. The user interface also includes user input means, such as push-button switches, toggle switches, other types of switches, a keypad, or the like. The smart card scanner 813 is adapted for performing data read/write operations on a smart identification card 817 which includes a smart card microprocessor 819.

FIG. 9 is a flowchart showing a procedure for use in conjunction with the hardware configuration of FIG. 8. The procedure commences at block 901, where a motor vehicle decreases its velocity as it approaches a toll booth. The motorist inserts the smart identification card into the smart card scanner (block 903). At block 907, the smart card scanner conducts a test to see whether or not the scanner can read at least one toll account file identifier, as well as the toll account balance file associated with this toll account identifier, from the smart identification card. If the smart card scanner cannot read the aforementioned items from the smart identification card, program control is diverted to block 905, where the scanner user interface provides an audible and/or visual indication that the smart identification card is unreadable and/or a toll account has not been set up.

If the smart card scanner can read one or more toll account file identifiers and the corresponding toll account balance files from the smart identification card, then the procedure progresses to block 909, where the motor vehicle transceiver transmits an initiation signal to the toll booth transceiver. The initiation signal includes all toll account file identifiers which were read from the smart identification card in block 907. In actuality, this initiation signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others. In response to the initiation signal, the toll booth transceiver downloads the initiation signal to the toll booth microprocessor (block 911).

The toll booth microprocessor places the toll account file identifiers included as a part of the initiation signal into a buffer in toll booth microprocessor memory (block 912). The toll booth microprocessor searches microprocessor memory to locate a file identifier stored in microprocessor memory which is identical to one of the toll account file identifiers included in the initiation signal received from the motor vehicle transceiver (also block 912). If an identical match of file identifiers is not found, the procedure loops back to block 905. If an identical match of file identifiers is found, the procedure continues to block 913, where the toll booth microprocessor instructs the toll booth transceiver to issue an acknowledgment signal which echoes the identically matching file identifier back to the motor vehicle transceiver. In actuality, this acknowledgment signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others.

The motor vehicle transceiver receives the acknowledgment signal and downloads the received file identifiers to the smart card scanner (block 914). The smart card scanner downloads the received file identifiers to the smart card microprocessor (block 915). The smart card microprocessor compares the received file identifiers with the toll account file identifiers stored in the smart card (block 917). At block 919, a test is performed to determine whether the received file identifiers match the toll account file identifiers stored on the smart identification card. If the received and stored file identifiers match, then program control progresses to block 927 in FIG. 9B. If the received and stored file identifiers do not match, the program diverts to block 921. The presence of a match means that the received and stored file identifiers are identical, in the sense that every one of the received file identifiers is identical to one of the toll account file identifiers stored in the smart identification card.

The negative branch of block 919 leads to block 921, where the scanner user interface provides a visual and/or audible indication: "There is a communications link problem. Do you wish to try the automated smart card toll payment system again, or do you wish to pay toll manually?" At block 925, the user enters the toll payment method selection into the scanner user interface. If the user specifies manual payment (block 923), the program exits, and if the user specifies "try again", the program loops back to block 903.

Figure 9A:
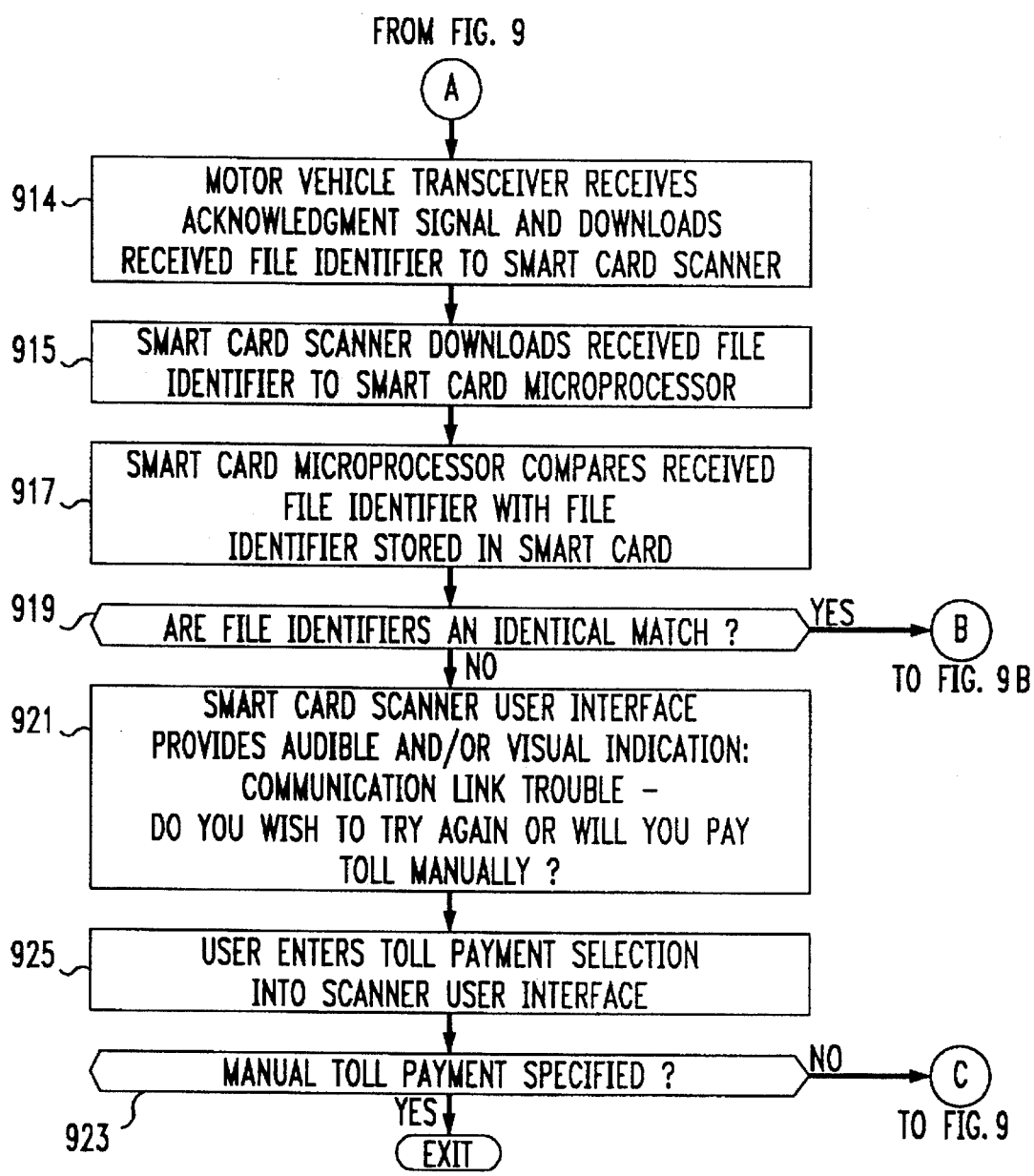
Figure 9B:
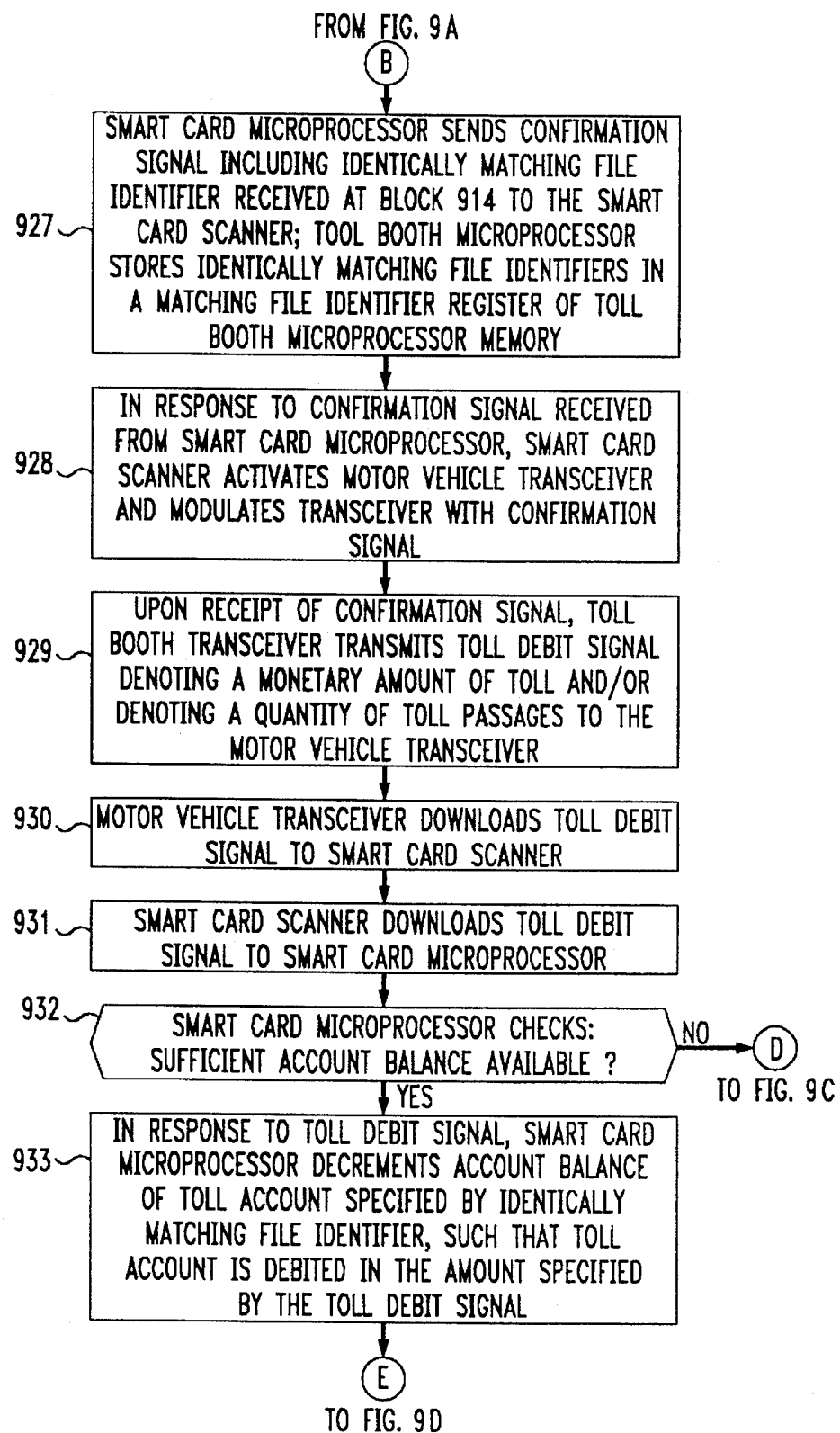
Figure 9C:
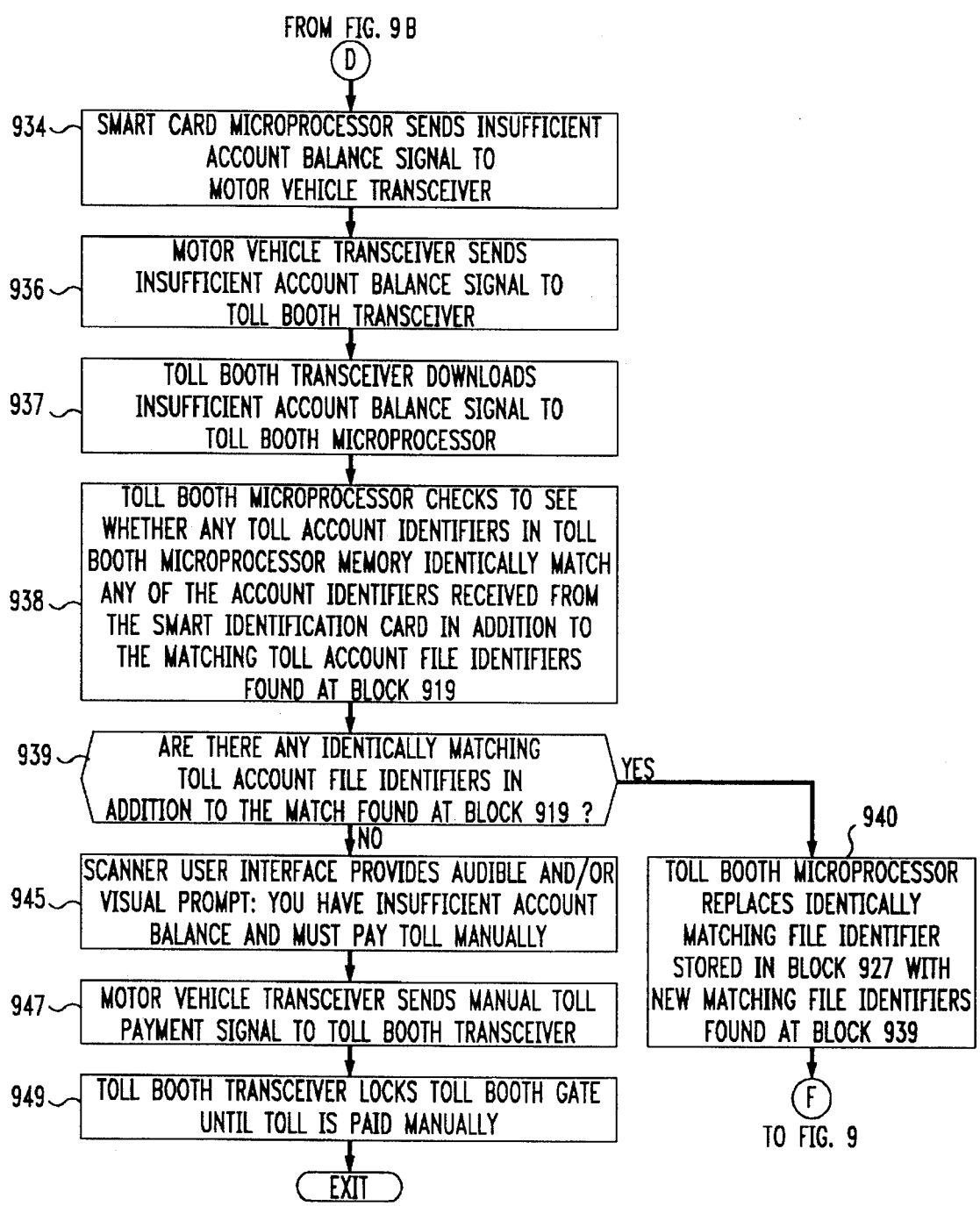

The affirmative branch of block 919 leads to block 927 of FIG. 9B, where the smart card microprocessor sends a confirmation signal to the smart card scanner. The confirmation signal includes the identically matching file identifier received at block 914. In actuality, this confirmation signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others. At this time, the toll booth microprocessor stores the matching file identifier in a matching file identifier register of toll booth microprocessor memory.

In response to the confirmation signal received from the smart card microprocessor, the smart card scanner activates the motor vehicle transceiver and modulates the transceiver with the confirmation signal (block 928). Upon receipt of the confirmation signal, the toll booth transceiver transmits a toll debit signal denoting a monetary amount of toll and/or denoting a quantity of toll passages to the motor vehicle transceiver (block 929). In actuality, this toll debit signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others. The motor vehicle transceiver downloads the toll debit signal to the smart card scanner (block 930), and the smart card scanner downloads the toll debit signal to the smart card microprocessor (block 931).

At block 932, in response to the toll debit signal, the smart card microprocessor checks smart identification card memory to ascertain whether or not sufficient account balance exists in the toll account balance file specified by the identically matching file identifier downloaded to the smart card microprocessor at block 915. If sufficient account balance exists, the program progresses to block 933. If there is insufficient account balance, the program branches to block 934. At block 933, the smart card microprocessor decrements the account balance of the toll account specified by the identically matching file identifier, such that the toll account is debited in the amount specified by the toll debit signal. The amount by which the toll account is debited may be specified, for example, as a monetary amount, and/or as a quantity of toll passages. After the account is debited at block 933, the program jumps ahead to block 951 (FIG. 9D), to be described below.

The negative branch from block 932 leads to block 934 where the smart card microprocessor sends an "insufficient account balance" signal to the motor vehicle transceiver. In actuality, this "insufficient account balance" signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others.

The motor vehicle transceiver sends the insufficient account balance signal to the toll booth transceiver (block 936), and the toll booth transceiver downloads the "insufficient account balance" signal to the toll booth microprocessor (block 937). The toll booth microprocessor checks to see whether any toll account identifiers in areas of toll booth microprocessor memory other than the buffer area identically match any of the toll account identifiers received from the smart identification card and stored in the buffer area in block 912 (block 938). At block 939, if a set of identically matching file identifiers is located in addition to the matching file identifiers which were previously found in block 919, program control progresses to block 940. However, if a set of identically matching file identifiers is not located in addition to the matching set already found at block 919, the program progresses to block 945.

The procedure of block 940 is performed upon execution of the affirmative branch from block 939. At block 940, the toll booth microprocessor replaces the identically matching file identifiers previously found in block 919 with the identically matched file identifiers found in block 939. Recall that the matching file identifier found in block 919 was stored in a toll booth microprocessor memory register termed the matching file identifier register at block 927. At block 940, the toll booth microprocessor writes the matching file identifier found at block 939 to this register, such that the contents of this register now includes one copy of the matching file identifier found at block 939. The program then loops back to block 913 (FIG. 9).

The negative branch from block 939 leads to block 945, where the scanner user interface provides an audible and/or visual prompt: "After checking the account balances of all applicable toll payment accounts, it has been determined that you have insufficient account balance to use the automated smart card toll payment system. You must pay for the toll manually!" The motor vehicle transceiver then sends a manual toll payment signal to the toll booth transceiver (block 947). In actuality, this manual toll payment signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others. The toll booth transceiver locks the toll booth gate until the toll is paid manually (block 949). After the toll is paid, the program waits for the next vehicle to approach the toll booth, whereupon the program loops back to block 901.

Figure 9D:
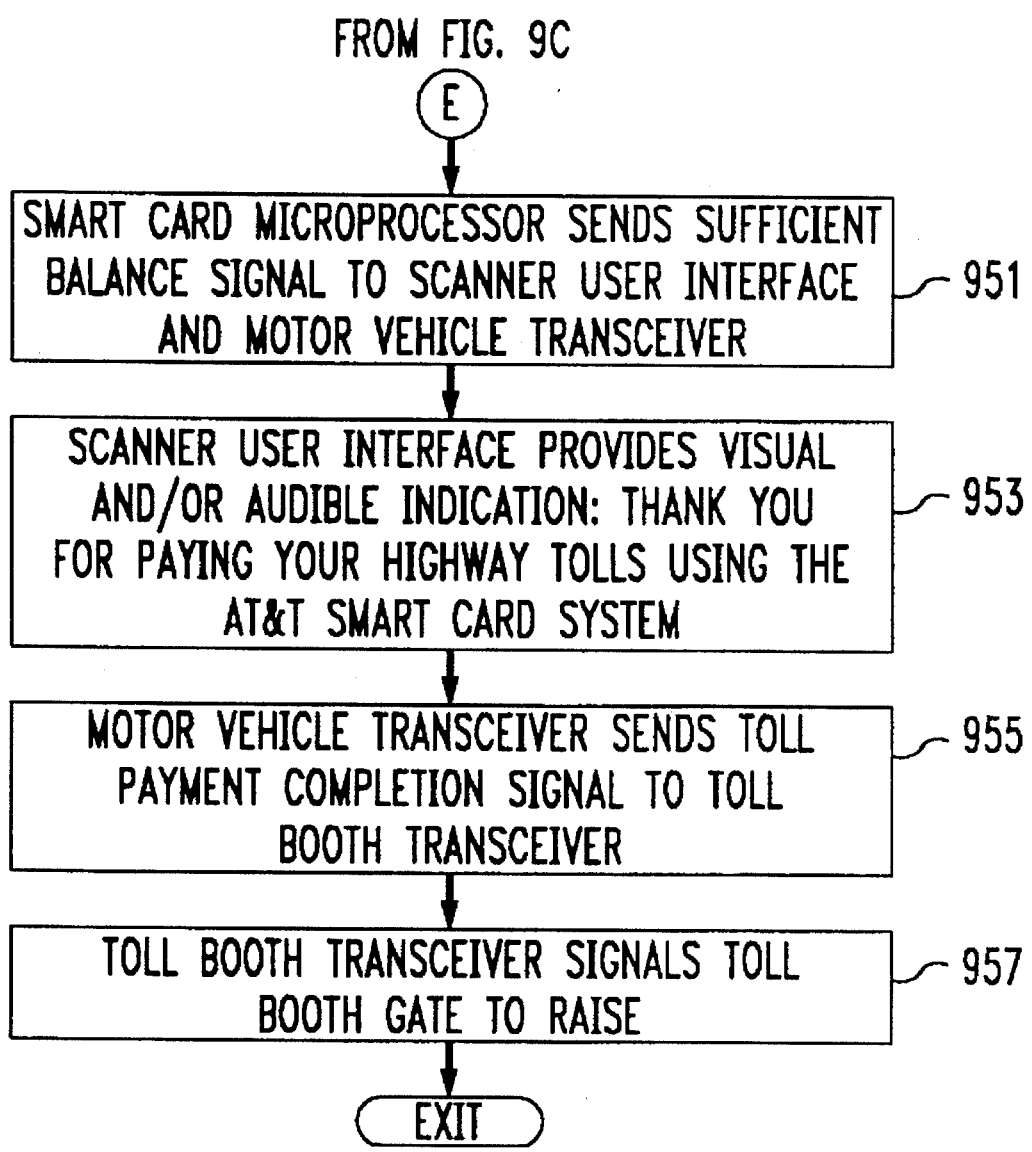

The affirmative branch from block 933 leads to block 951 (FIG. 9D). Recall that this affirmative branch is followed at block 933 when the smart card microprocessor determines that there is sufficient account balance in the smart identification card holder's toll account to pay for the toll. At block 951, the smart card microprocessor sends a sufficient balance signal to the scanner user interface and the motor vehicle transceiver. In actuality, this sufficient balance signal may comprise a specific, arbitrarily-selected binary value and/or binary sequence. The specific sequence or value selected for this purpose is an arbitrary design parameter which may be determined by the system designer. Such a binary signal is placed on an RF carrier by the vehicle transceiver using conventional modulation techniques, such as, for example, PCM (pulse-code modulation), FSK (frequency-shift keying), SSB (single-sideband), FM (frequency modulation), and others.

At block 953, the scanner user interface provides a visual and/or audible indication: "Thank you for paying your highway tolls using the AT&T Smart Card System!" The motor vehicle sends a toll payment completion signal to the toll booth transceiver (block 955), and the toll booth transceiver signals the toll booth gate to raise (block 957). This toll payment completion signal may comprise a specific, arbitrarily-selected binary value and/or binary sequence. The specific sequence or value selected for this purpose is an arbitrary design parameter which may be determined by the system designer. After block 957 is executed, the program waits until another motor vehicle approaches the toll booth, whereupon the program loops back to block 901.

Figure 10:
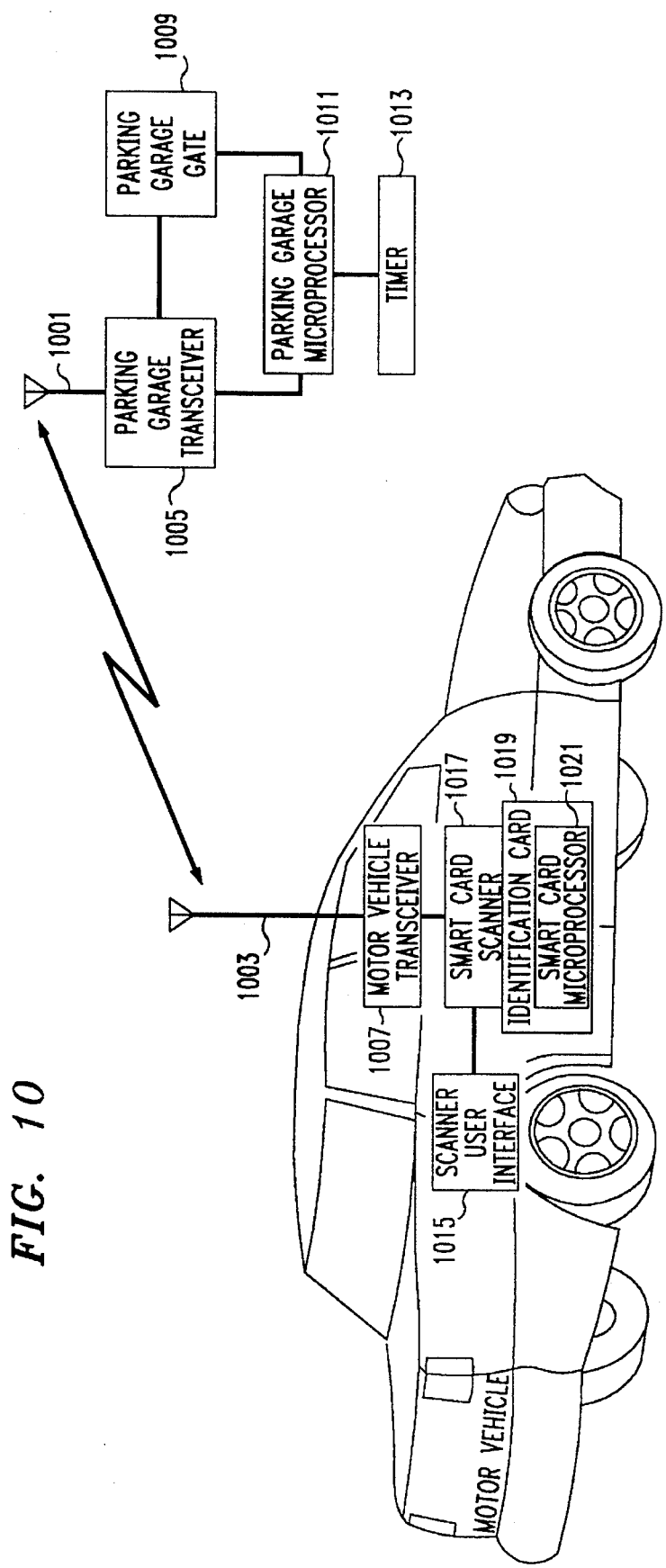
FIG. 10 is a hardware block diagram illustrating a smart card identification system for use at a parking facility.

FIG. 10 is a hardware block diagram illustrating a smart card identification system for use at a parking facility. A motor vehicle is equipped with a motor vehicle transceiver 1007 coupled to a motor vehicle antenna 1003. The motor vehicle transceiver 1007 is adapted to interface with a smart card scanner 1017. The smart card scanner 1017 is connected to a scanner user interface 1015 which includes any combination of a keypad, a keyboard, push-button switches, contact switches, other types of switches, an alphanumeric display, an LCD display, a video display screen, a voice synthesis circuit, an audio oscillator, indicator lamps/LEDs, and the like.

Smart card scanner 1017 is adapted to perform read/write operations on a smart card, such as smart identification card 1019, which includes a smart card microprocessor 1021. Smart card scanner 1017 is substantially the same scanner as that described in connection with FIG. 2 as smart card scanner 105. Motor vehicle transceiver 1007 is designed for two-way (i.e., bi-directional) RF communications with a parking garage transceiver 1005 used by a parking facility. Such transceivers could operate on virtually any convenient frequency band under Part 15 of Federal Communications Commission Rules. If the relatively modest power levels permitted under Part 15 are not sufficient to provide adequate coverage in a given system application, higher RF power levels may be employed, although an FCC license may be required in some cases. For example, the motor vehicle transceiver 1007 and the parking garage transceiver 1005 may be designed for operation on certain frequencies within the 27-MHz, 49-MHz, 800-MHz, 900-MHz, and/or 2-gHz ranges, and/or on certain frequencies within the VHF and UHF public service bands (30–50 MHz, 148–174 MHz, and 450–512 MHz). Use of some of the aforementioned frequency ranges may require an FCC license.

The motor vehicle transceiver 1007 includes a modulator circuit which accepts digital input from smart card scanner 1017 and uses the digital input to modulate an RF carrier. Conventional modulation schemes may be employed, such as FSK (frequency-shift keying), PCM (pulse-code modulation), SSB (single sideband), FM (frequency modulation), and others. Motor vehicle antenna 1003 is adapted to transmit and receive on the frequency band or bands utilized by motor vehicle transceiver 1007.

Parking garage transceiver 1005 includes a modulator circuit which accepts digital input from a parking garage microprocessor 1011 and uses the digital input to modulate an RF carrier. Conventional modulation schemes may be employed, as mentioned in the above paragraph with respect to motor vehicle transceiver 1007. The parking garage transceiver 1005 includes a transmitter adapted for reception on the motor vehicle transceiver 1007. The motor vehicle transceiver 1007 includes a transmitter adapted for reception on the parking garage transceiver 1005. The parking garage transceiver 1005 is coupled to a parking garage antenna 1001. The parking garage microprocessor 1011 is a commonly available microprocessor of a type known to those skilled in the art. The microprocessor 1011 is coupled to a timer 1013. Timer 1013 is a clock which keeps track of the date and the time of day, and provides the date and the time to the microprocessor in a digital format as a plurality of bits. A parking garage gate 1009 controls motor vehicle access into and out of the parking garage. This parking garage gate is controlled by the microprocessor 1011 and/or the parking garage transceiver 1005. Conventional components may be employed for smart card scanner 1017, motor vehicle transceiver 1007, parking garage transceiver 1005, scanner user interface 1015, parking garage antenna 1001, parking garage microprocessor 1011, timer 1013, parking garage gate 1009, and motor vehicle antenna 1003.

Figure 11:
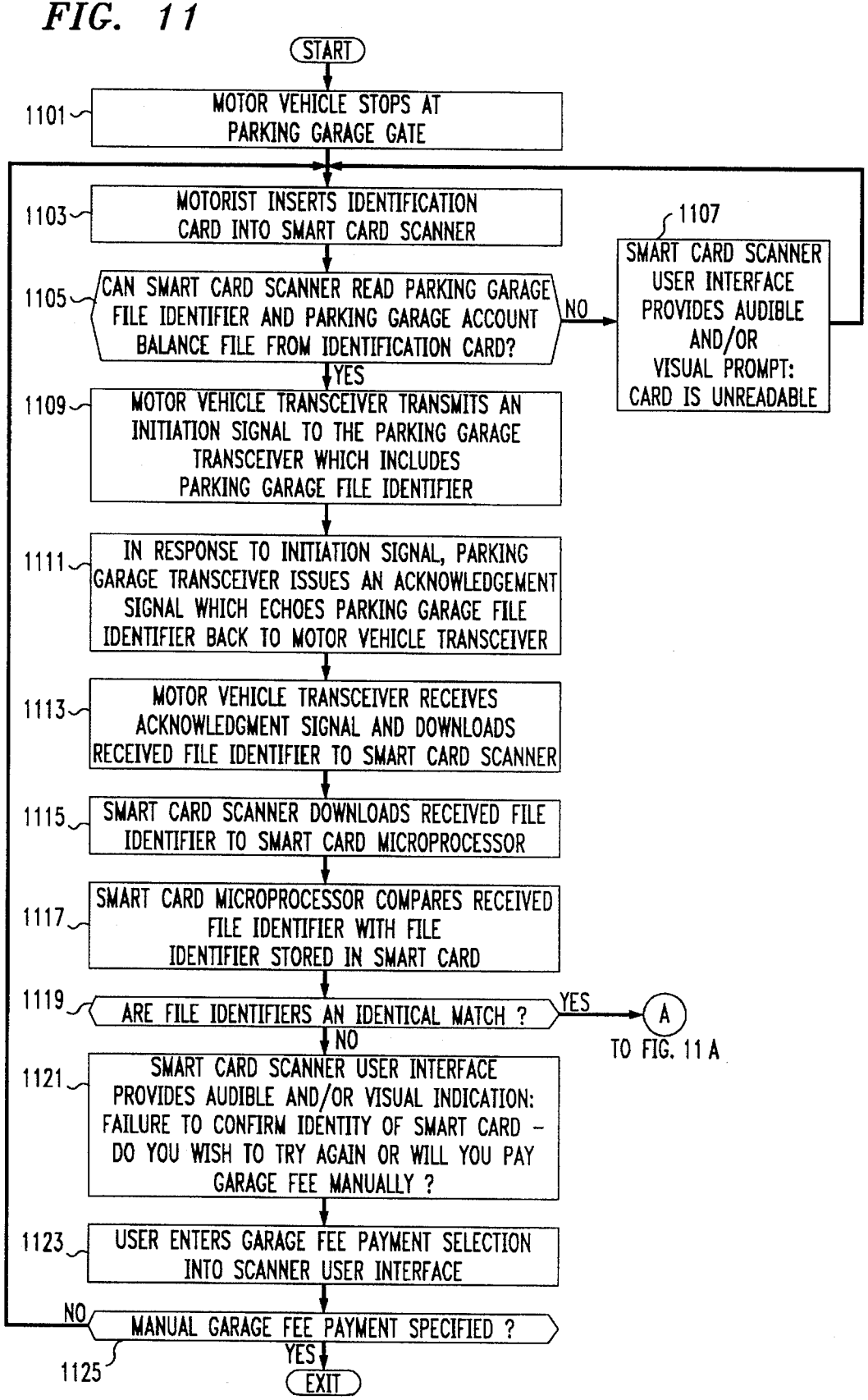

FIG. 11 is a flowchart showing a procedure for use in conjunction with the hardware diagram of FIG. 10. The procedure starts at block 1101, where a motor vehicle stops at the parking garage gate upon entering a parking facility. The motorist inserts a smart identification card into the smart card scanner (block 1103). At block 1105, a test is performed to ascertain whether or not the smart card scanner can read a parking garage file identifier and a parking garage account balance file from the smart identification card. If not, the program diverts to block 1107, where the smart card scanner user interface provides a visual and/or audible prompt: "Your smart identification card is unreadable, or you have not set up a parking garage account." The program then loops back to block 1103, whereupon the motorist may either (a) have the scanner make a second attempt at reading the identification card, or (b) elect to handle the parking garage transaction manually (i.e., using conventional techniques such as taking a paper ticket, etc.).

The affirmative branch from block 1105 leads to block 1109, where the motor vehicle transceiver transmits an initiation signal to the parking garage transceiver which includes a parking garage file identifier. This initiation signal may comprise a specific, arbitrarily-selected binary value and/or binary sequence. The specific sequence or value selected for this purpose is an arbitrary design parameter which may be determined by the system designer. Such a binary signal is placed on an RF carrier by the motor vehicle transceiver using conventional modulation techniques, such as, for example, PCM (pulse-code modulation), FSK (frequency-shift keying), SSB (single-sideband), FM (frequency modulation), and others. Accordingly, the initiation signal may contain a digital and/or encoded representation of the parking garage file identifier.

In response to the initiation signal, the parking garage transceiver issues an acknowledgment signal which echoes the parking garage file identifier (i.e., a digital representation of the parking garage file identifier) back to the motor vehicle transceiver (block 1111). The acknowledgment signal may comprise a specific, arbitrarily-selected binary value and/or binary sequence. Therefore, the acknowledgment signal may include a digital representation of the parking garage file identifier. The specific sequence or value selected for the acknowledgment signal is an arbitrary design parameter which may be determined by the system designer.

The motor vehicle transceiver receives the acknowledgment signal and downloads the received file identifier to the smart card scanner (block 1113). The motor vehicle transceiver may receive the acknowledgment signal in digital and/or encoded form, whereupon the transceiver demodulates and/or decodes the signal, for example, using conventional demodulation techniques for demodulating PCM (pulse-code modulation), FSK (frequency-shift keying), SSB (single-sideband), FM (frequency modulation), or other types of modulated signals.

The smart card scanner downloads the received file identifier to the smart card microprocessor (block 1115), and the smart card microprocessor compares the received file identifier with the file identifier stored in the smart card (block 1117). At block 1119, a test is performed by the smart card microprocessor to determine whether or not the file identifiers compared at block 1117 are an identical match. If not, the program branches to block 1121, whereupon the smart card scanner user interface provides an audible and/or visual indication: "Failure to confirm identity of smart card—do you wish to try the smart card automated payment system again, or do you wish to pay garage fee manually?" The user then enters the garage fee payment selection into the scanner user interface (block 1123). At block 1125, a bit representing the fee payment selection is downloaded to the smart card microprocessor which performs a test to determine the user's fee payment selection. If manual garage fee payment is specified, the program exits, and if "try the smart card automated payment system again" is specified, the program loops back to block 1103.

The affirmative branch from block 1119 leads to block 1127 of FIG. 11A, where the smart card microprocessor sends a confirmation signal signifying a file identifier identical match to the smart card scanner. In actuality, this confirmation signal may comprise a specific, arbitrarily-selected binary value and/or binary sequence. The specific sequence or value selected for this purpose is an arbitrary design parameter which may be determined by the system designer. In response to the confirmation signal received from the smart card microprocessor, the smart card scanner activates the motor vehicle transceiver and modulates the transceiver with the confirmation signal (block 1129). If a binary signal is employed for the confirmation signal, this binary signal is placed on an RF carrier by the motor vehicle transceiver using conventional modulation techniques, such as, for example, PCM (pulse-code modulation), FSK (frequency-shift keying), SSB (single-sideband), FM (frequency modulation), or other types of known modulation schemes.

Upon receipt of the confirmation signal, the parking garage transceiver forwards the signal to the parking garage microprocessor (block 1131). If a binary signal is employed for the confirmation signal, this signal is demodulated by the parking garage transceiver using conventional demodulation techniques for PCM, FSK, SSB, FM, or other appropriate conventional demodulation techniques. The parking garage microprocessor reads the value of the timer and downloads the value of the timer to the parking garage transceiver, where the value is stored in a timer buffer (block 1133). The parking garage microprocessor includes a random-access memory device which is organized to include a register, termed the timer buffer, for storing the value of the timer. The parking garage transceiver transmits the value of the timer to the motor vehicle transceiver using conventional modulation techniques (block 1135), and the motor vehicle transceiver receives the value of the timer using conventional demodulation techniques (block 1137). The value of the timer received by the motor vehicle transceiver is downloaded in to the smart card microprocessor (block 1137).

Figure 11B:
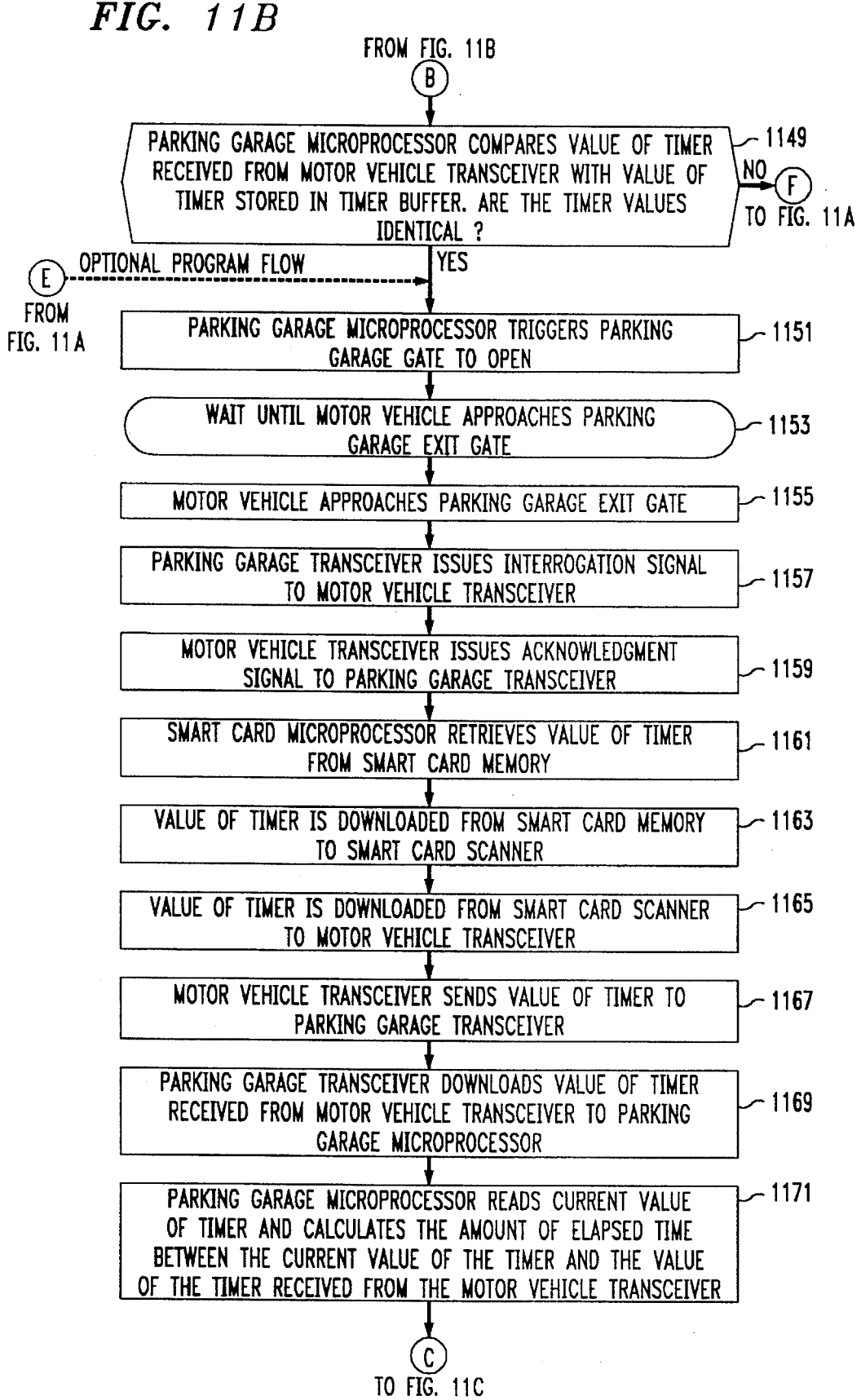
Figure 11C:
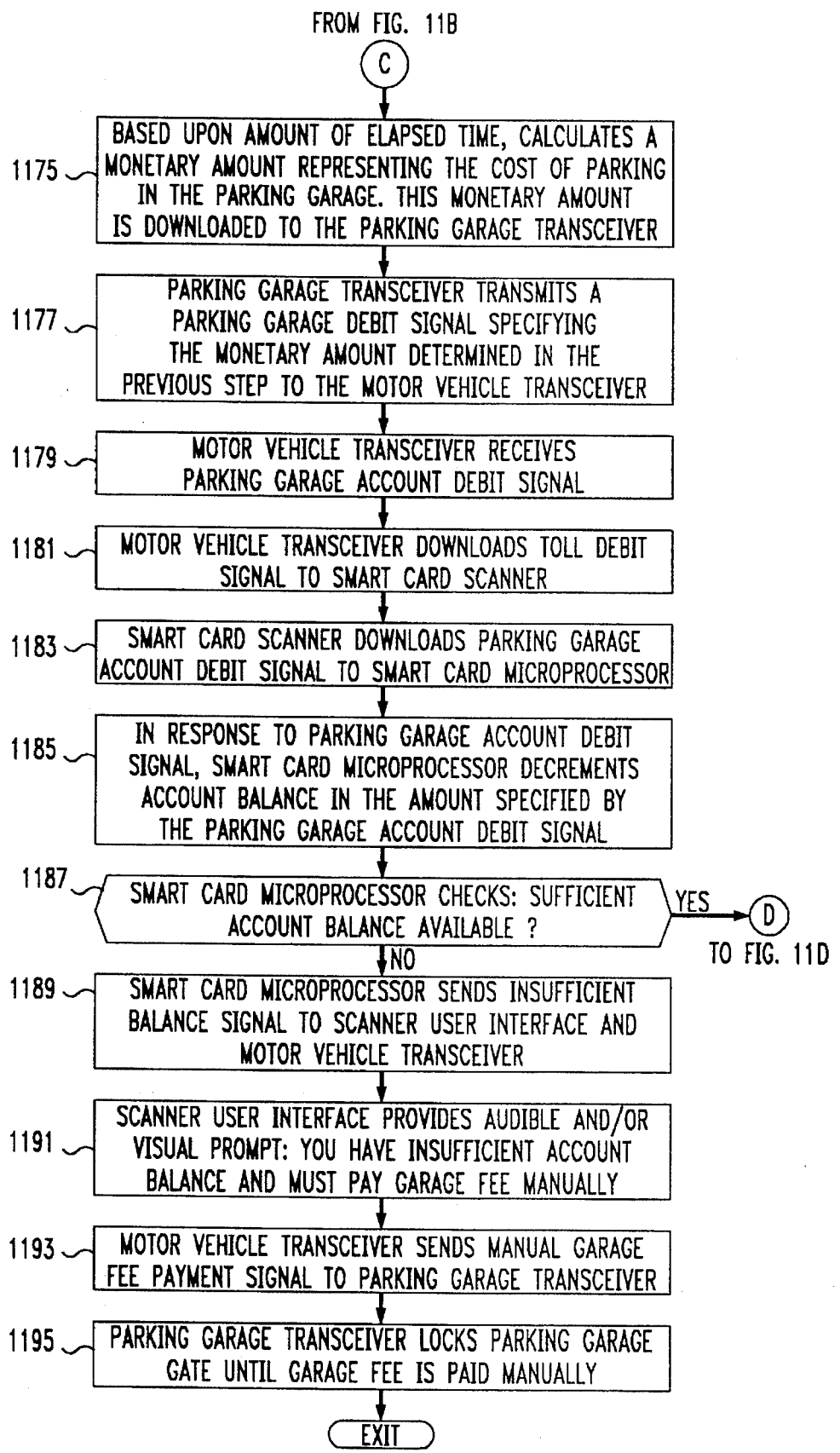

The smart card microprocessor stores the value of the timer in smart card memory (block 1139). At this point, the program progresses to block 1141 or, in an alternate embodiment of the procedure of FIG. 11, the program jumps ahead to block 1151 (FIG. 11B). Assume for now that the program progresses to block 1141; the sequence of steps performed at block 1151 will be described in more detail below. The smart card microprocessor copies the stored value of the timer and forwards (downloads) this value to the smart card scanner (block 1141). The smart card scanner downloads the value of the timer to the motor vehicle transceiver (block 1143). The motor vehicle transceiver transmits the value of the timer back to the parking garage transceiver (block 1145). The parking garage transceiver receives the value of the timer and downloads the value to the parking garage microprocessor (block 1147). The parking garage microprocessor compares the value of the timer received from the motor vehicle transceiver with the value of the timer stored in the timer buffer, and performs a test to ascertain whether or not these timer values are identical (block 1149). If not, the program loops back to block 1133. Note that, if the program loops back to block 1133 from block 1149 more than a certain minimum number of trials (i.e., two or three), the scanner user interface could be activated to provide an error/fraud message, and the program would then exit, instructing the user to see the parking garage attendant.

The affirmative branch from block 1149 leads to block 1151, where the parking garage microprocessor triggers the parking garage gate to open. The motor vehicle then enters the parking garage and pulls into an available parking space. The time at which the motorist entered the parking garage is now stored in the smart identification card, and need not be retained in the timer buffer of the parking garage microprocessor. At this point, the program waits until the motor vehicle approaches the parking garage exit gate (block 1153).

Upon exiting the parking garage, the motor vehicle approaches the parking garage exit gate (block 1155). The parking garage transceiver issues an interrogation signal to the motor vehicle transceiver (block 1157). In actuality, this interrogation signal may comprise a specific, arbitrarily-selected binary value and/or binary sequence. The specific sequence or value selected for this purpose is an arbitrary design parameter which may be determined by the system designer. If a binary signal is employed for the interrogation signal, this binary signal is placed on an RF carrier by the parking garage transceiver using conventional modulation techniques, such as, for example, PCM (pulse-code modulation), FSK (frequency-shift keying), SSB (single-sideband), FM (frequency modulation), or other types of known modulation schemes.

The motor vehicle transceiver issues an acknowledgment signal to the parking garage transceiver (block 1159) in response to the receipt of the interrogation signal transmitted at block 1157. The interrogation signal may be received using conventional demodulation techniques, and the acknowledgment signal may be encoded and/or modulated using conventional coding and/or modulation schemes. The smart card microprocessor retrieves the value of the timer from smart card memory (block 1161), and the value of the timer is downloaded from smart card memory to the smart card scanner (block 1163). The value of the timer is then downloaded from the smart card scanner to the motor vehicle transceiver (block 1165). The motor vehicle transceiver sends the value of the timer to the parking garage transceiver (block 1167), and the parking garage transceiver downloads the value of the timer received from the motor vehicle transceiver to the parking garage microprocessor. The parking garage microprocessor reads the current value of the timer and calculates the amount of elapsed time as the difference between the current (present) value of the timer and the value of the timer received from the motor vehicle transceiver (block 1171).

At block 1175, the parking garage microprocessor calculates a monetary amount based upon the amount of elapsed time calculated at block 1171. This monetary amount represents the cost of parking in the parking garage or parking facility. This monetary amount is downloaded to the parking garage transceiver. The parking garage transceiver transmits a debit signal specifying the amount of money determined in the previous step to the motor vehicle transceiver (block 1177). Note that, although the present example utilizes a monetary amount for purposes of debiting the smart identification card, it is alternatively possible to debit the smart identification card in terms of a predetermined quantity of permitted parking garage entries and/or exits.

Figure 11D:
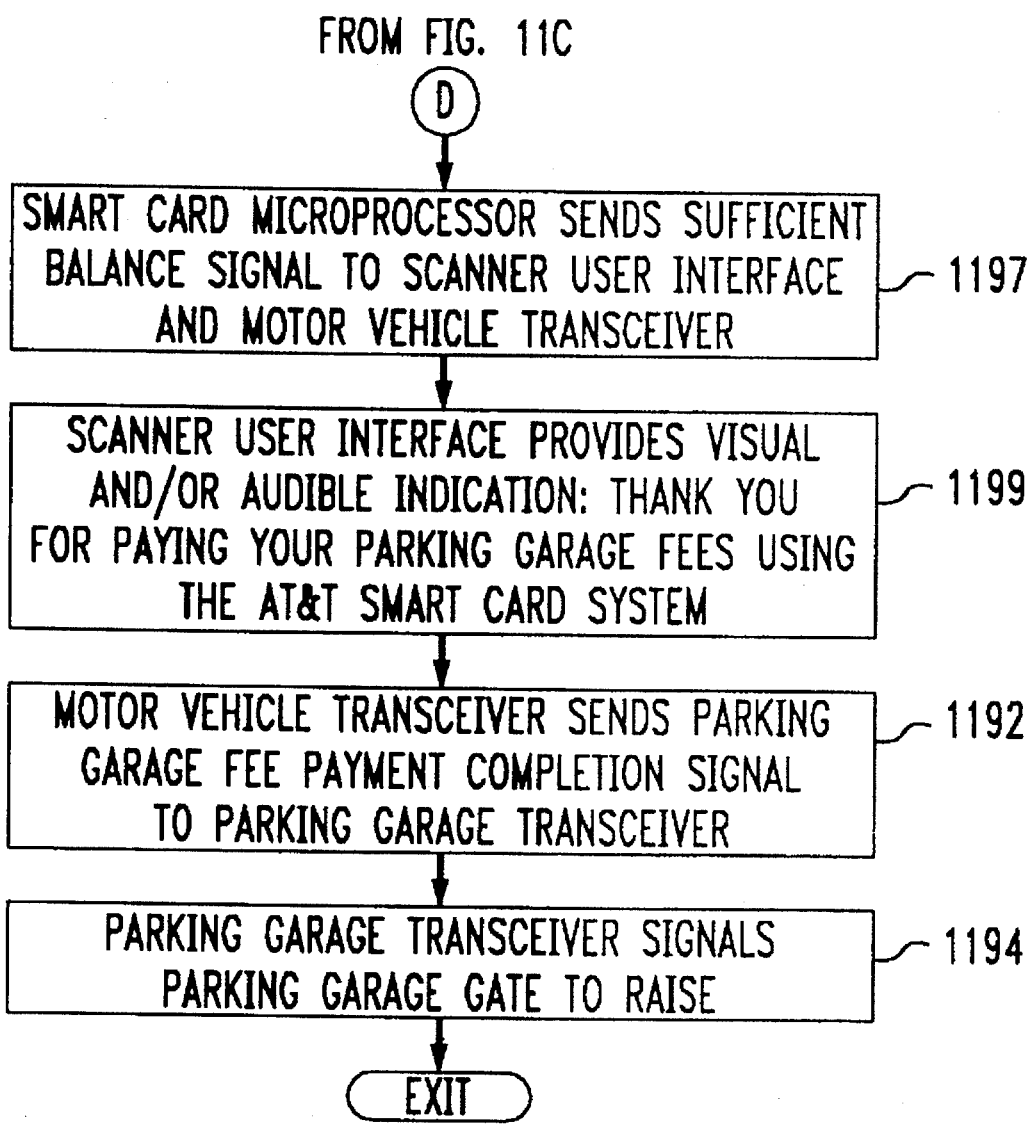

The motor vehicle transceiver receives the debit signal (block 1179) and downloads the debit signal to the smart card scanner (block 1181). In turn, the smart card scanner downloads the debit signal to the smart card microprocessor (block 1183). In response to the debit signal, the smart card microprocessor decrements the parking garage account balance in the amount specified by the debit signal. The smart card microprocessor performs a test at block 1187 to ascertain whether or not sufficient parking garage account balance exists to pay for the parking garage fee (i.e., the monetary amount calculated in block 1175). The affirmative branch from block 1187 leads to block 1197 (FIG. 11D), and the negative branch from block 1187 leads to block 1189. At block 1189, the smart card microprocessor sends an insufficient account balance signal to the motor vehicle transceiver via the scanner user interface. The scanner user interface provides an audible and/or visual indication: "You have insufficient account balance and must pay the parking facility fee manually!" The motor vehicle transceiver sends a manual garage fee payment signal to the parking garage transceiver (block 1193), and the parking garage transceiver locks the parking garage gate until the garage fee is paid manually (block 1195). Upon manual payment of the garage fee, the program exits.

The affirmative branch from block 1187 (signifying that the smart identification card contains a sufficient parking garage account balance) leads to block 1197, where the smart card microprocessor sends a sufficient balance signal to the motor vehicle transceiver via the scanner user interface. The scanner user interface provides a visual and/or audible indication: "Thank you for paying your parking garage fees using the AT&T Smart Card system" (block 1199). The motor vehicle transceiver sends a parking garage fee payment completion signal to the parking garage transceiver (block 1192), and the parking garage transceiver signals the parking garage gate to raise (block 1194). The program then loops back to block 1101.

Figure 12:
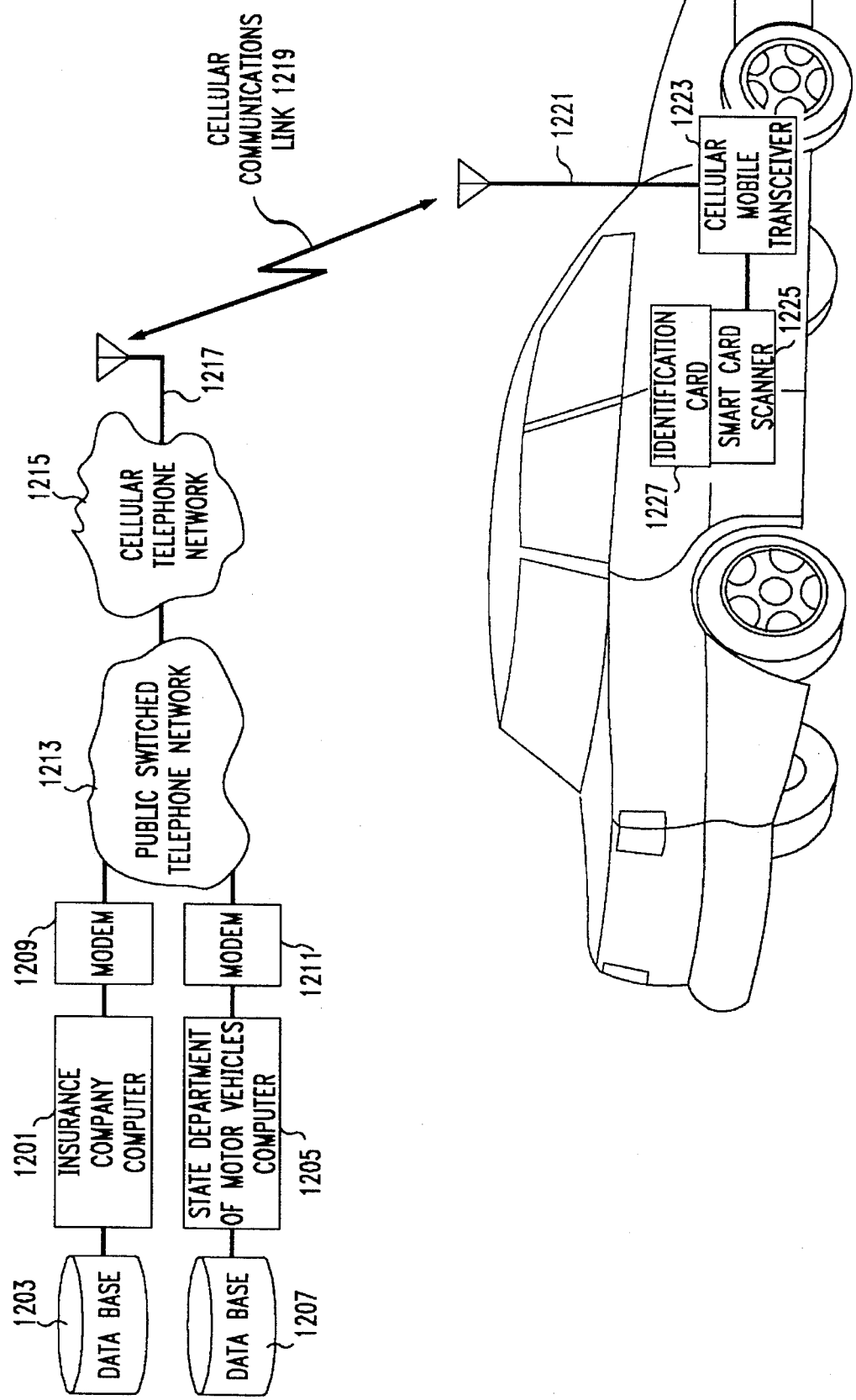
FIG. 12 is a hardware block diagram illustrating a smart card identification system in the context of an automobile insurance provider.

FIG. 12 is a hardware block diagram illustrating a smart card identification system in the context of an automobile insurance provider. An insurance company computer 1201 is configured to access database 1203. Database 1203 includes a plurality of automobile insurance policy files. Each automobile insurance policy file is associated with an insurance policy identifier which uniquely specifies a particular automobile insurance policy file. The automobile insurance policy files each include an insurance policy expiration date, the VINs (vehicle identification numbers) of all motor vehicles covered by the policy, the name and address of the policyholder, the drivers license number and social security number of the policyholder, the terms of the policy (amount deductible, coverage for collision, liability, etc), motor vehicle code violations committed by the policyholder, and a policy payment record listing payments actually made by the policyholder, the date such payments were made, and any payments owing and due.

A State Department of Motor Vehicles computer 1205 is configured to access database 1207. Database 1207 includes a plurality of motor vehicle registration files and drivers license files. Each drivers license file is associated with a file identifier, such as a drivers license number and/or a social security number, which uniquely specifies a particular motorist. Each motor vehicle file is associated with a file identifier, such as a drivers license number and/or a social security number (or, in the case where more than one person owns a motor vehicle, a plurality of drivers license numbers and/or social security numbers), which uniquely identifies the owner (or owners) of a particular motor vehicle. The drivers license files include drivers license information such as the name, address, height, weight, eye color, hair color, and birthdate of a motorist, along with any motor vehicle code violations committed by this motorist, and the insurance company covering the motorist. Each motor vehicle file includes the VIN (vehicle identification number) of a motor vehicle, the identity of the insurance company covering the motor vehicle, the identity of the vehicle owner, the expiration date of the motor vehicle registration covered by the policy, and the address of the motor vehicle owner.

The insurance company computer 1201 is coupled to modem 1209, which is a modem of conventional design. The State Department of Motor Vehicles computer 1205 is coupled to modem 1211, also a modem of conventional design. Modems 1209 and 1211 are equipped for data communications over a conventional public switched telephone network 1213. The public switched telephone network 1213 is adapted for communications with a conventional cellular telephone network 1215. Cellular telephone network 1215 is equipped with a cellular antenna 1217 for communicating over a cellular communications link 1219.

A motor vehicle is equipped with a cellular antenna 1221 coupled to a conventional cellular mobile transceiver 1223. The cellular mobile transceiver is adapted to transmit and receive digital signals from smart card scanner 1225, by using conventional modulation techniques for placing digital information on an analog RF carrier. Examples of suitable digital modulation techniques include PCM (pulse code modulation), QAM (quadrature amplitude modulation), FSK (frequency shift keying), PWM (pulse width modulation), CDMA, TDMA, and others. Smart card scanner 1225 is adapted to perform read/write operations on a smart card, such as identification card 1227. This smart card scanner 1225 is substantially similar to smart card scanner 105 discussed previously in conjunction with FIG. 2.

Figure 13:
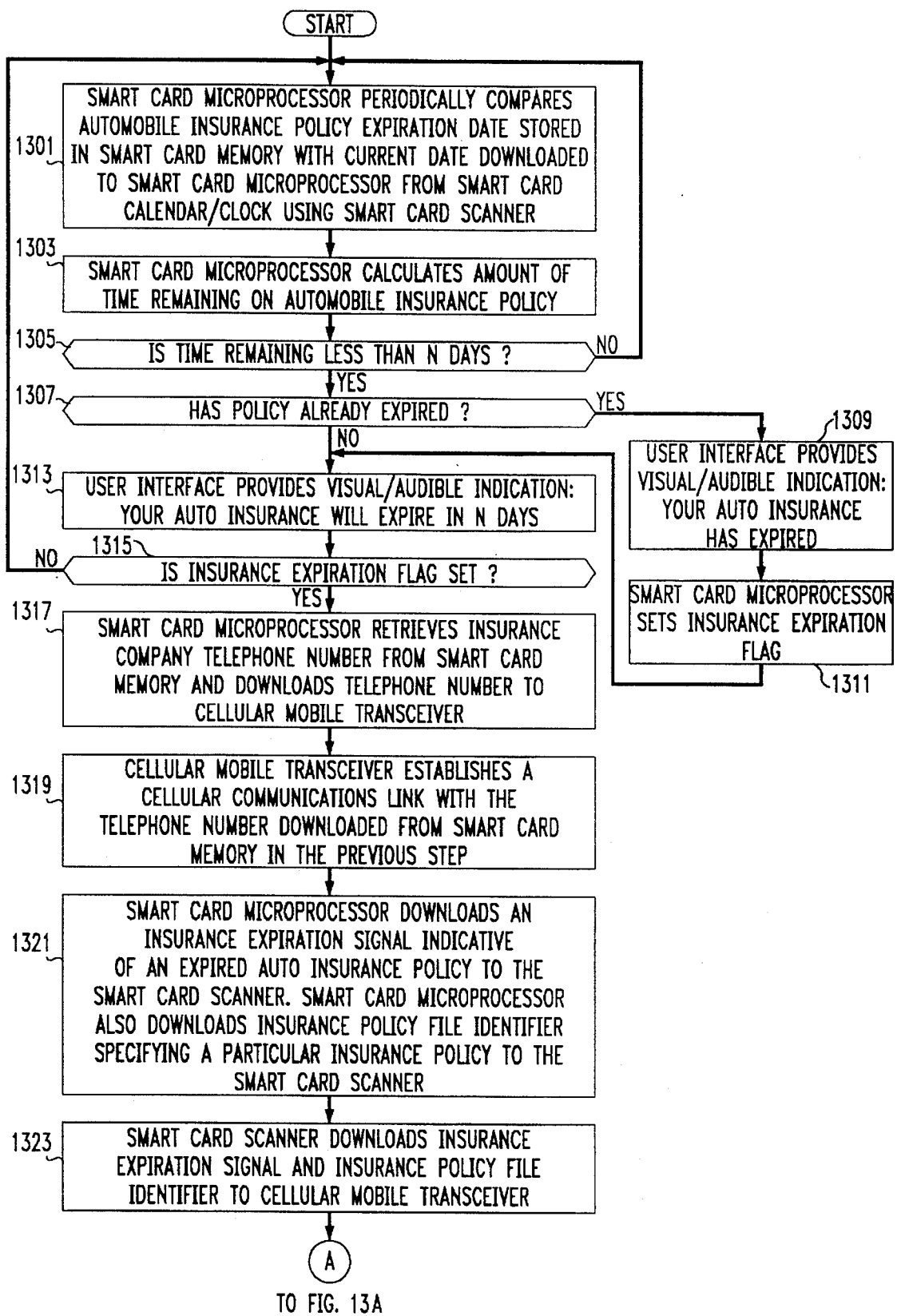
FIG. 13 and 13a, 13b, 13c and 13d are flowcharts setting forth a procedure for use in connection with the hardware of FIG. 12.

FIG. 13 is a flowchart setting forth a procedure for use in connection with the hardware of FIG. 12. The procedure commences at block 1301, where the smart card microprocessor periodically compares the automobile insurance policy expiration date stored in smart identification card memory with the current date downloaded to the smart card microprocessor from the smart card calendar/clock via the smart card scanner. These periodic comparisons may occur at regular intervals, such as once a day, by using the smart card microprocessor clock, and/or the smart card calendar/clock, as a time reference. Alternatively, the comparisons may be programmed in the smart card microprocessor to occur whenever the smart identification card is inserted into the smart card scanner. Next, at block 1303, the smart card microprocessor calculates the amount of time remaining on the automobile insurance policy. At block 1305, a check is performed to determine whether or not the time remaining on the policy is less than N days. Any convenient value may be chosen for N, such as, for example, five days or seven days. If the time remaining is not less than N days, then the program loops back to block 1301 and waits until the next periodic check of the expiration date is to occur.

The affirmative branch from block 1305 leads to block 1307, where a test is implemented to ascertain whether or not the insurance policy has already expired. If so, the program progresses to block 1309, where the user interface provides a visual and/or audible indication: "Your automobile insurance has expired!". The smart card microprocessor sets an insurance expiration flag at block 1311, which is a bit that is assigned a first value ("set") to signify that insurance has expired, and a second value ("not set") to signify that insurance has not expired. The program then continues to block 1313.

The negative branch from block 1307 leads directly to block 1313, where the user interface provides a visual and/or audible indication: "Your automobile insurance will expire in N days!". The program checks at block 1315 to see whether or not the insurance expiration flag is set. If the flag is not set, the program returns to block 1301 and waits for the next periodic check of insurance expiration date to occur.

If the flag is set, the program progresses to block 1317, where the smart card microprocessor retrieves the insurance company telephone number from smart card memory. The telephone number is downloaded into the cellular mobile transceiver. The cellular mobile transceiver establishes a cellular communications link with the telephone number downloaded from smart card memory in the preceding step (block 1319). The smart card microprocessor downloads an insurance expiration signal indicative of an expired auto insurance policy to the smart card scanner. This insurance expiration signal may be a binary/digital signal as previously described in conjunction with confirmation signals. The smart card microprocessor also downloads an insurance policy file identifier specifying a particular auto insurance policy to the smart card scanner (block 1321). The smart card scanner downloads the insurance expiration signal and the insurance policy file identifier to the cellular mobile transceiver (block 1323), and the cellular mobile transceiver transmits the insurance expiration signal and the insurance policy identifier to the insurance company over the cellular communications link (block 1325). The insurance company then sends "bulk" (i.e., batched) updates of expired insurance policies to the State Department of Motor Vehicles (block 1327).

At block 1329, the program waits until an insurance payment is received at the insurance company. The program then continues to block 1331, where the insurance company receives a payment for a specific insurance policy having a corresponding insurance policy file identifier. The insurance company computer searches an insurance policy contact table which associates each of a plurality of insurance policy identifiers with a corresponding cellular telephone number (this is the cellular telephone number of the cellular mobile transceiver in the motor vehicle owned by the insurance policy holder). At block 1333, the insurance company computer searches the insurance policy contact table to locate the cellular telephone number corresponding to the insurance policy identifier of block 1331. The insurance company computer (at block 1335) establishes a cellular communications link with the telephone number located in the previous step (block 1333). The insurance company computer (block 1337) then sends a receipt of payment signal to the cellular mobile transceiver. This signal, indicative of the insurance company receiving payment for the auto insurance policy specified by the insurance policy identifier set forth in block 1333, may be of digital/binary form, as described previously in conjunction with confirmation signals. The insurance company computer sends an expiration date signal to the cellular mobile transceiver (block 1339). This expiration date signal, which may be in binary/digital form, specifies the new expiration date of the automobile insurance policy after the payment received from the policyholder is credited to the policy (this payment was received/credited at block 1331). The cellular mobile transceiver downloads the receipt of payment signal and the expiration date signal to the smart card scanner (block 1341).

Figure 13A:
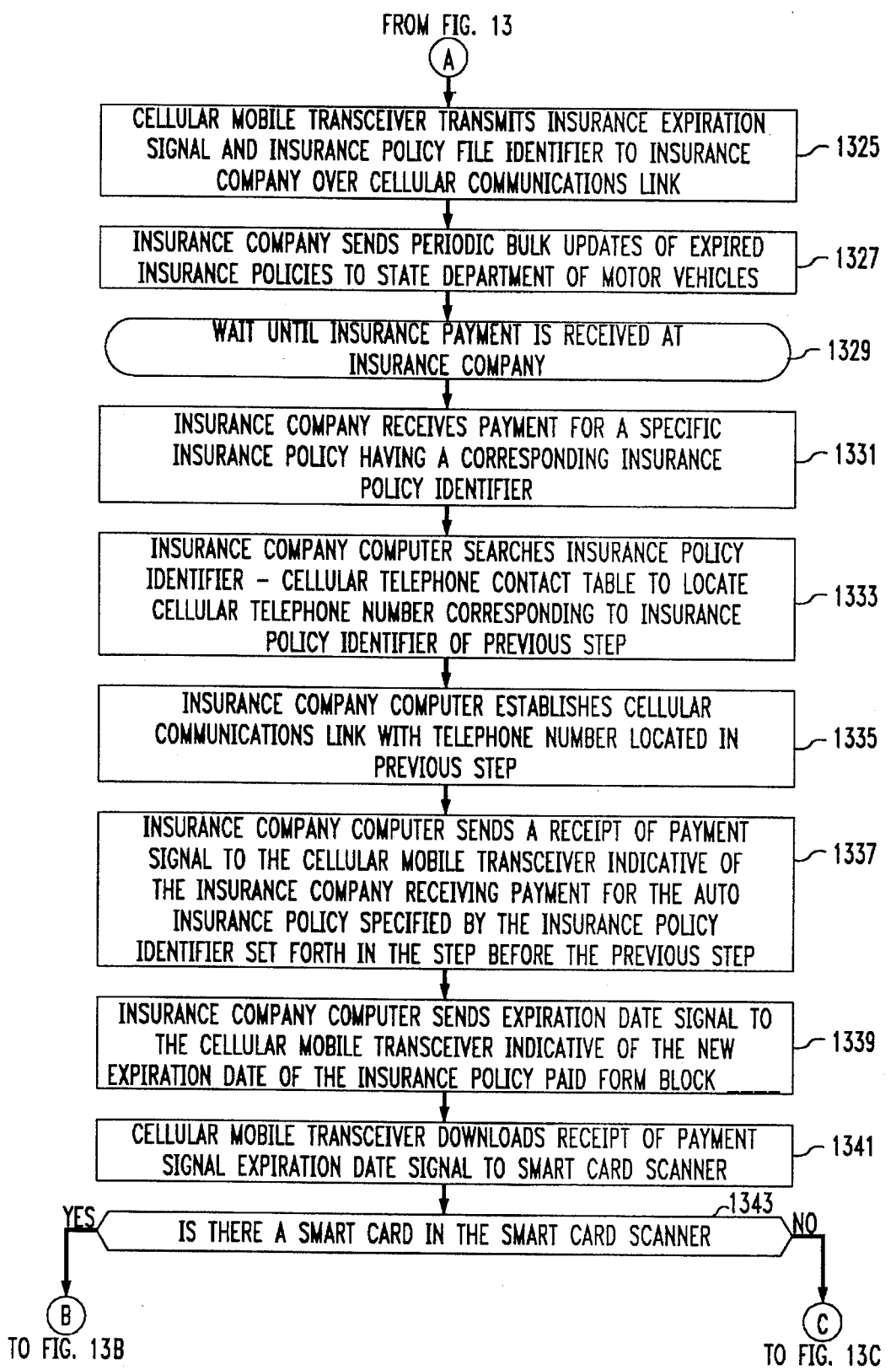
Figure 13B:
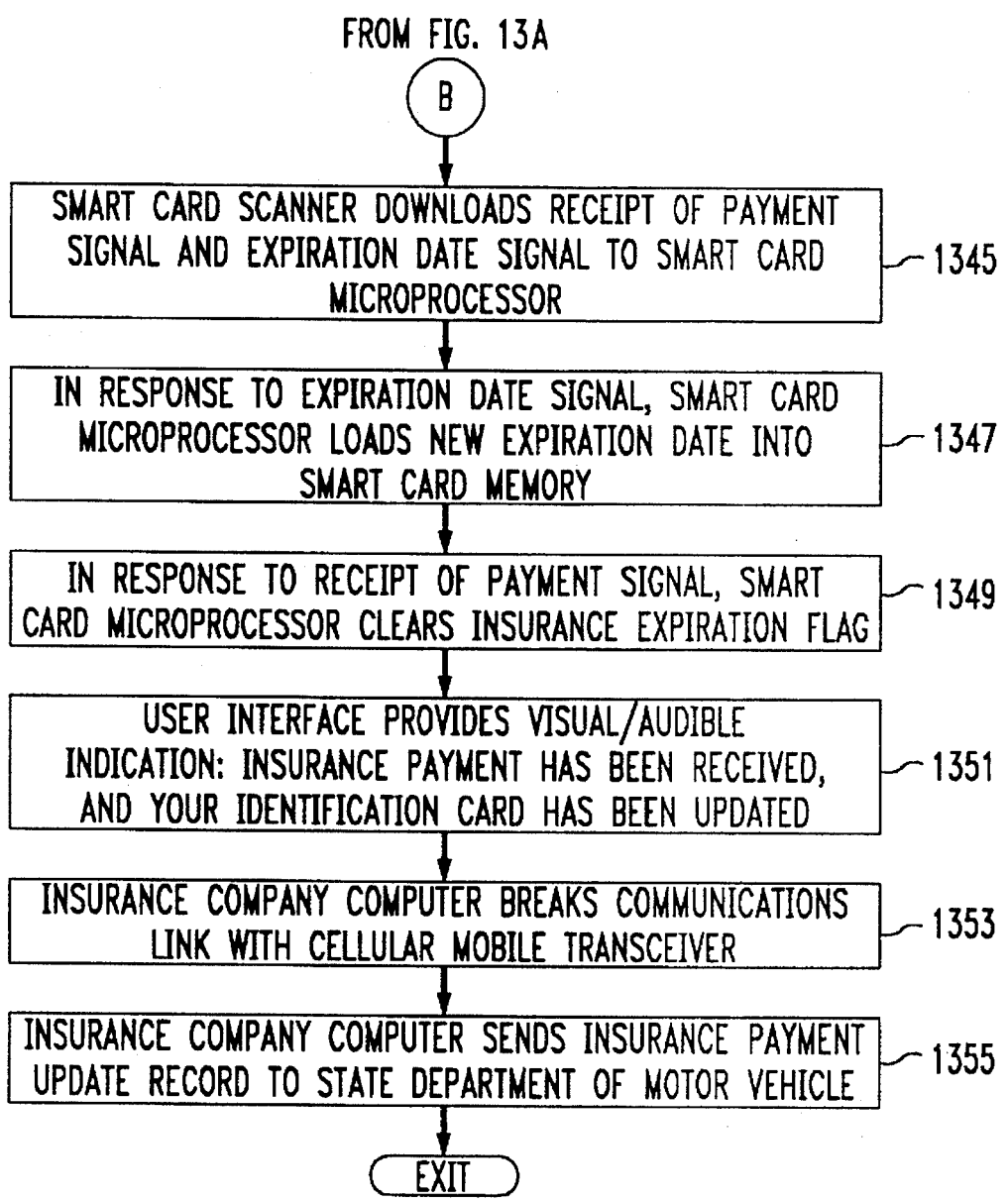
Figure 13C:
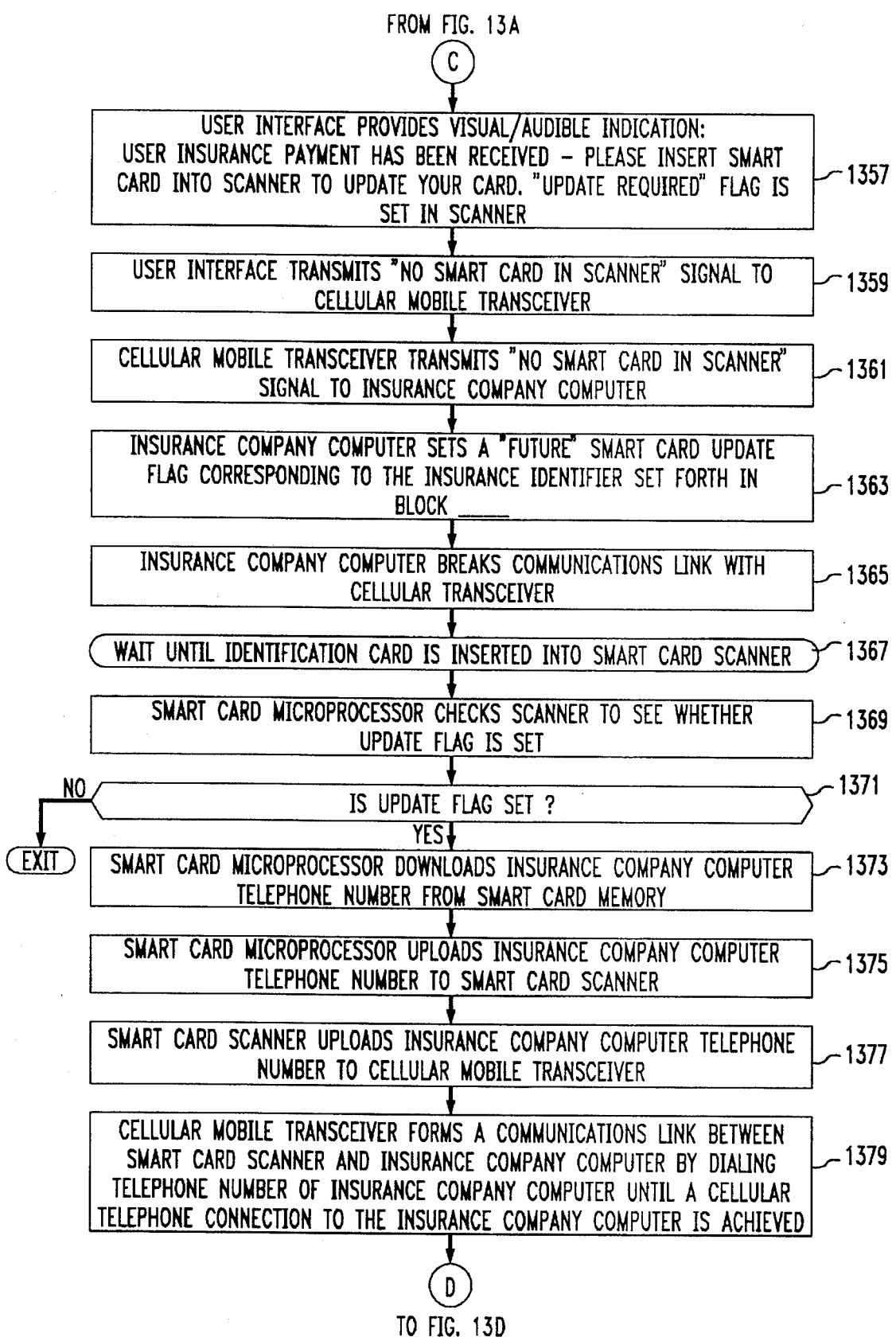
Figure 13D:
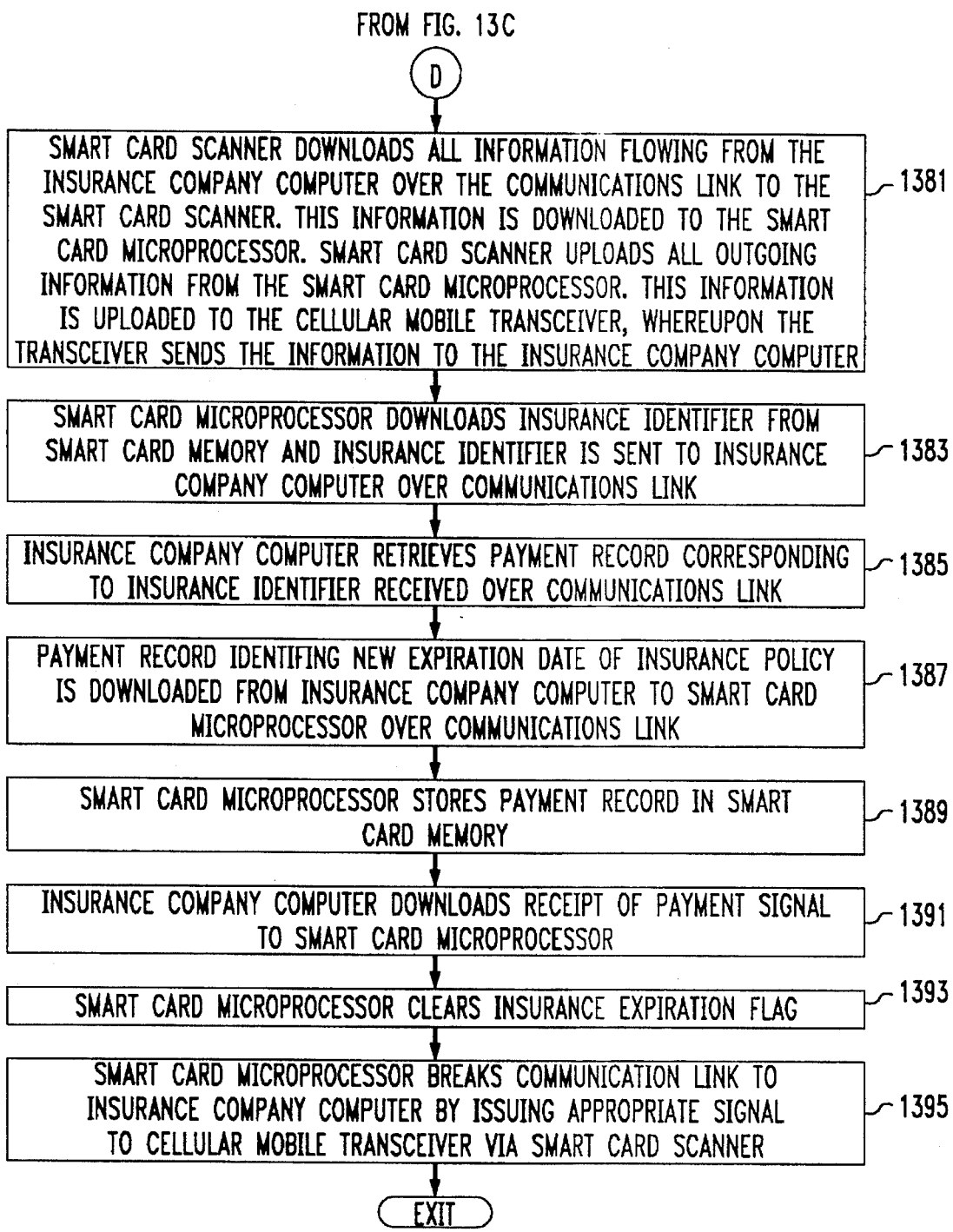

At block 1343, a test is performed to determine whether or not there is a smart card in the smart card scanner. If so, the program progresses to block 1345 (FIG. 13B), and if not, the program progresses to block 1357 (FIG. 13C). At block 1345, the smart card scanner downloads the receipt of payment signal and the expiration date signal to the smart card microprocessor. In response to the expiration date signal, the smart card microprocessor loads a new insurance policy expiration date into smart card memory (block 1347). In response to the receipt of payment signal, the smart card microprocessor clears the insurance expiration flag (block 1349). The user interface provides a visual and/or audible indication: "Your insurance payment has been received, and your smart identification card has been updated!" (block 1351). The insurance company computer breaks the communications link with the cellular mobile transceiver (block 1353), and the insurance company computer sends an insurance payment update record (indicating that the policyholder has made an insurance payment) to the State Department of Motor Vehicles database (block 1355). This insurance payment update record may be sent to the Department of Motor Vehicles database using modems and the public switched telephone network. The program then exits.

The negative branch from block 1343 (FIG. 13A) leads to block 1357 (FIG. 13C), where the user interface provides a visual and/or audible indication: "Your automobile insurance payment has been received—please insert your smart identification card into the smart card scanner so that your card may be updated!". An "update required" flag is then set in the smart card scanner. This update required flag may be provided in the form of a flip-flop integrated into the smart card scanner. The flip flop has a first "unset" state when the smart identification card does not need to be updated, and a second "set" state when the smart identification card needs to be updated.

The user interface transmits a "no smart identification card in scanner" signal to the cellular mobile transceiver (block 1359). This signal is indicative of the fact that there is no smart identification card in the smart card scanner, and the signal may be of digital/binary form. The cellular mobile transceiver transmits the "no smart identification card in scanner" signal to the insurance company computer (block 1361). The insurance company computer sets a "future smart card update" flag (block 1363) corresponding to the insurance identifier set forth in block 1331. Each insurance identifier stored in the insurance company computer is associated with a corresponding "future smart card update" flag. This flag is a bit with a first value ("set") indicating the requirement for a smart identification card update, and a second value ("not set") indicating no requirement for a smart identification card update. The insurance company computer breaks the communications link with the cellular transceiver (block 1365).

At block 1367, the program waits until a smart identification card is inserted into the smart card scanner. The smart card microprocessor checks the scanner to see whether the update flag is set (block 1369). Note that the smart card scanner may also perform optional preliminary checks to ascertain the identity of the smart identification card inserted therein. Such a check need not only be performed at block 1369, and could be implemented every time a smart identification card is inserted into the scanner. For example, the scanner may be equipped with a memory register in the form of a read-only memory which stores file identifier "A" 131 (FIG. 1) and/or file identifier "B" 133. Every time a smart identification card is inserted into the smart card scanner, the smart identification card microprocessor implements a preliminary comparison, for example, between file identifier "A" 131 stored on the smart identification card and file identifier "A" as stored in the memory register of the scanner. If the file identifiers do not match, the smart card scanner would provide a message "Your smart card is not authorized for use with this scanner!". If the identifiers do match, the program would proceed to the next step, which in the example discussed immediately above, is block 1369.

At block 1371, the program checks to see whether the update flag is set. If not, the program exits. If so, the program continues to block 1373 where the smart card microprocessor downloads the insurance company computer telephone number from smart card memory. This telephone number is associated with a given insurance policy file identifier, as was described in conjunction with FIG. 1. The smart card microprocessor uploads the insurance company computer telephone number to the smart card scanner (block 1375), and the smart card scanner uploads the insurance company computer telephone number to the cellular mobile transceiver (block 1377). The cellular mobile transceiver forms a communications link between the smart card scanner and the insurance company computer by dialing the telephone number of the insurance company computer until a cellular telephone connection to the insurance company computer is achieved (block 1379).

Next, at block 1381, the smart card scanner downloads all information flowing from the insurance company computer over the cellular communications link to the smart card scanner. This information is downloaded to the smart card microprocessor. The smart card scanner uploads all outgoing information from the smart card microprocessor. This information is uploaded to the cellular mobile transceiver, whereupon the transceiver sends the information to the insurance company computer. The smart card microprocessor downloads the automobile insurance policy file identifier from smart card memory and this insurance policy file identifier is sent to the insurance company computer over the cellular communications link (block 1383). The insurance company computer retrieves a payment record (block 1385) in an insurance policy file corresponding to the insurance policy file identifier received over the cellular communications link in the previous step. The payment record, identifying the new expiration date of the automobile insurance policy, is downloaded from the insurance company computer to the smart card microprocessor over the cellular communications link (block 1387). The smart card microprocessor stores the payment record in smart card memory (block 1389). The insurance company computer downloads a receipt of payment signal, signifying receipt of an insurance policy premium (payment), to the smart card microprocessor (block 1391). The smart card microprocessor clears the insurance expiration flag (block 1393), and the smart card microprocessor breaks the communications link to the insurance company computer by issuing the appropriate signals to the cellular mobile transceiver via the smart card scanner (block 1395). The program then exits.

Although various particular embodiments have been disclosed or suggested, it is clear that others are possible within the spirit and scope of the invention. For example, various security and/or data encryption algorithms may be utilized to encrypt/encode communications to/from the smart identification card. Suitable security and/or data encryption algorithms are disclosed in U.S. Pat. Nos. 5,120,939 and 5,310,999, issued to the assignee of the present patent application. Those skilled in the art will understand that the security techniques disclosed in U.S. Pat. Nos. 5,120,939 and 5,310,999 may be applied to any of the systems and/or methods disclosed herein.

We claim:

1. A smart identification card for integrating and administering records related to the ownership and/or operation of motor vehicles, and for use in a system including a centralized database of motor vehicle records, the smart identification card including memory means organized for storing a plurality of file identifiers, each file identifier uniquely specifying a file stored on the centralized database of motor vehicle records.

2. A smart identification card for integrating and administering records related to the ownership and/or operation of motor vehicles, and for use in a system including a plurality of centralized databases, each centralized database including a plurality of motor vehicle records related to the operation and/or ownership of motor vehicles, the smart identification card including memory means organized for storing a plurality of file identifiers, each file identifier uniquely specifying a file stored on any of the plurality of centralized databases of motor vehicle records.

3. A smart identification card as set forth in claim 2 wherein the memory means stores a plurality of file identifiers corresponding to a single motorist.

4. A smart identification card as set forth in claim 2 wherein the motor vehicle records include items selected from the group of motor vehicle registration information, drivers license information, vehicle code violations, automobile insurance information, parking garage entry times, parking garage account balance, highway toll account balance, motor club information, and environmental inspection information.

5. A smart identification card as set forth in claim 3 wherein the motor vehicle records include items selected from the group of motor vehicle registration information, drivers license information, vehicle code violations, automobile insurance information, parking garage entry times, parking garage account balance, highway toll account balance, motor club information, and environmental inspection information.

6. A smart identification card as set forth in claim 5 further including communications interface means for interfacing with a communications link coupled to any of a plurality of computer databases.

7. A smart identification card as set forth in claim 6 wherein the communications interface means comprises an interface to a smart card scanner.

8. A smart identification card as set forth in claim 6 wherein the communications link comprises any combination of a landline telephonic link and/or a cellular telephonic link.

* * * * *